United States Patent
Singh et al.

(10) Patent No.: US 10,599,627 B2
(45) Date of Patent: Mar. 24, 2020

(54) AUTOMATICALLY CONVERTING SPREADSHEET TABLES TO RELATIONAL TABLES

(71) Applicant: Microsoft Technology Licensing, LLC, Redmond, WA (US)

(72) Inventors: Rishabh Singh, Kirkland, WA (US); Sumit Gulwani, Sammamish, WA (US); Dana Drachsler Cohen, Haifa (IL)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 513 days.

(21) Appl. No.: 15/443,531

(22) Filed: Feb. 27, 2017

(65) Prior Publication Data
US 2018/0246915 A1    Aug. 30, 2018

(51) Int. Cl.
*G06F 16/22*   (2019.01)
*G06F 16/25*   (2019.01)

(52) U.S. Cl.
CPC .......... *G06F 16/221* (2019.01); *G06F 16/25* (2019.01)

(58) Field of Classification Search
CPC ......... Y10S 707/99943; Y10S 707/956; G06F 16/284; G06F 16/258; G06F 16/86; G06F 16/84; G06F 17/246; G06F 17/30315
See application file for complete search history.

(56) References Cited

U.S. PATENT DOCUMENTS

| | | |
|---|---|---|
| 6,502,101 B1 | 12/2002 | Verprauskus et al. |
| 7,124,144 B2 | 10/2006 | Christianson et al. |
| 7,487,168 B2 | 2/2009 | Rys et al. |
| 7,571,182 B1 * | 8/2009 | Eddy ............... G06F 16/283 707/999.102 |
| 9,146,916 B2 | 9/2015 | Moroze |

(Continued)

FOREIGN PATENT DOCUMENTS

WO    2015175010 A1    11/2015

OTHER PUBLICATIONS

Adelfo et al. "Schema Extraction for Tabular data on the web". PVLDB vol. 6. p. 421-432 (Year: 2013).*

(Continued)

*Primary Examiner* — Yuk Ting Choi
(74) *Attorney, Agent, or Firm* — Faegre Drinker Biddle & Reath LLP

(57) ABSTRACT

Techniques are disclosed which provide for transforming a hierarchical table to a relational table. A hierarchical table may be received, in which a headline row is identified. A candidate row may be determined in the hierarchical table. The process may include systematically classifying headlines as data headlines or descriptors. For each data headline a new column may be generated, while for each descriptor headline, the table may be split to produce a resultant table. The resultant table may be stored and the process may be repeated until there are no headlines left to be classified. The steps performed by the system to transform the table can then be displayed on a user device using a program in the Domain-specific language, which can then be further inspected or modified to perform the desired table transformation.

20 Claims, 9 Drawing Sheets

(56) References Cited

U.S. PATENT DOCUMENTS

| | | | | |
|---|---|---|---|---|
| 2003/0101194 | A1* | 5/2003 | Rys | G06F 16/86 707/999.101 |
| 2004/0088320 | A1* | 5/2004 | Perry | G06F 16/86 707/999.103 |
| 2004/0220954 | A1* | 11/2004 | Zhou | G06F 16/86 707/999.101 |
| 2012/0198322 | A1 | 8/2012 | Gulwani et al. | |
| 2015/0095312 | A1* | 4/2015 | Gulwani | G06F 16/284 707/722 |
| 2015/0254530 | A1 | 9/2015 | Gulwani et al. | |

OTHER PUBLICATIONS

Nagy et al. "End to End conversion of HTML Tables for Populating a Relational Database". (Year: 2014).*

Chen et al. "Automatic Web Spreadsheet Data extraction". (Year: 2013).*

Embley, et al., "Converting Heterogeneous Statistical Tables on the Web to Searchable Databases", In International Journal on Document Analysis and Recognition, vol. 19, No. 2, Jun. 2016, pp. 1-21.

Roy, et al., "Evaluating Automatic Spreadsheet Metadata Extraction on a Large Set of Responses from MOOC Participants", In Proceedings of IEEE 23rd International Conference on Software Analysis, Evolution, and Reengineering, Mar. 14, 2016, pp. 135-145.

Eberius, et al., "DeExcelerator: A Framework for Extracting Relational Data from Partially Structured Documents", In Proceedings of the 22nd ACM international conference on Information & Knowledge Management, Oct. 27, 2013, pp. 2477-2479.

Gulwani, et al., "Spreadsheet Data Manipulation Using Examples", In Proceedings of Communications of the ACM, vol. 55, Issue 8, Aug. 2012, pp. 97-105.

Harris, et al., "Spreadsheet Table Transformations from Examples", In Proceedings of the 32nd ACM SIGPLAN Conference on Programming Language Design and Implementation, Jun. 4, 2011, 12 pages.

Nagy, et al., "Clustering header categories extracted from web tables", In Proceedings of SPIE, vol. 9402, Feb. 8, 2015, 3 pages.

Erbs, et al., "Hierarchy Identification for Automatically Generating Table-of-Contents", In Proceedings of Recent Advances in Natural Language Processing, Sep. 7, 2013, pp. 252-260.

Seth, et al., "Analysis and Taxonomy of Column Header Categories for Web Tables", In Proceedings of the 9th IAPR International Workshop on Document Analysis Systems, Jun. 9-11, 2010, pp. 81-88.

Barowy, et al., "Checkcell: Data debugging for spreadsheets", In Proceedings of the ACM International Conference on Object Oriented Programming Systems Languages & Applications, Oct. 20, 2014, pp. 507-523.

Barowy, et al., "Flashrelate: Extracting relational data from semi-structured spreadsheets using examples", In Proceedings of the 36th ACM SIGPLAN Conference on Programming Language Design and Implementation, Jun. 13, 2015, pp. 218-228.

Chang, et al., "Using and exploring hierarchical data in spreadsheets", In Proceedings of the CHI Conference on Human Factors in Computing Systems, May 7, 2016, pp. 2497-2507.

Chen, et al., "Automatic web spreadsheet data extraction", In Proceedings of the 3rd International Workshop on Semantic Search over the Web, Aug. 30, 2013, 8 pages.

Chen, et al., "Integrating spreadsheet data via accurate and low-effort extraction", In Proceedings of the 20th ACM SIGKDD international conference on Knowledge discovery and data mining, Aug. 24, 2014, pp. 1126-1135.

Cunha, et al., "From spreadsheets to relational databases and back", In Proceedings of the ACM SIGPLAN workshop on Partial evaluation and program manipulation, Jan. 19, 2009, pp. 179-188.

Embley, et al., "Transforming web tables to a relational database", In Proceedings of 22nd International Conference on Pattern Recognition, Aug. 24, 2014, 6 pages.

Fisher, et al., "The EUSES spreadsheet corpus: A shared resource for supporting experimentation with spreadsheet dependability mechanisms", In Proceedings of the first workshop on End-user software engineering, May 21, 2005, pp. 1-5.

Galhardas, et al., "AJAX: an extensible data cleaning tool", In Proceedings of the ACM SIGMOD international conference on Management of data, May 15, 2000, pp. 590.

Heer, et al., "Predictive interaction for data transformation", In Proceedings of 7th Biennial Conference on Innovative Data Systems Research, Jan. 4, 2015, 7 pages.

Igarashi, et al., "Fluid Visualization of Spreadsheet Structures", In Proceedings of IEEE Symposium on Visual Languages, Sep. 1998, 8 pages.

Kandel, et al., "Wrangler: Interactive Visual Specification of Data Transformation Scripts", In Proceedings of SIGCHI Conference on Human Factors in Computing Systems, May 7, 2011, pp. 3363-3372.

Liu, et al., "A Spreadsheet Algebra for a Direct Data Manipulation Query Interface", In Proceedings of 25th International Conference on Data Engineering, Mar. 29, 2009, 12 pages.

Needleman, et al., "A General Method Applicable to the Search for Similarities in the Amino Acid Sequence of Two Proteins", In Journal of Molecular Biology, vol. 48, Issue 3, 1970, pp. 443-453.

Raman, et al., "Potter's Wheel: An Interactive Data Cleaning System", In Proceedings of 27th International Conference on Very Large Data Bases, Sep. 11, 2001, 10 pages.

Savinov, Alexandr, "DataCommandr: Column-oriented Data Integration, Transformation and Analysis", In Proceedings of International Conference on Internet of Things and Big Data, Apr. 23, 2016, pp. 331-339.

Shigarov, et al., "Rule-Based Canonicalization of Arbitrary Tables in Spreadsheets", In Proceedings of International Conference on Information and Software Technologies, Oct. 15, 2015, 14 pages.

Tijerino, et al., "Towards Ontology Generation from Tables", In Journal of World Wide Web, Aug. 1, 2005, pp. 261-285.

Verborgh, et al., "Using OpenRefine", In Publication of Packt Publishing, Sep. 2013.

D. Huynh, et al. Google refine. http://code.google.com/p/google-refine/.

\* cited by examiner

| | A | B | C | D | E | F | G | H | I | J | K | L |
|---|---|---|---|---|---|---|---|---|---|---|---|---|
| 1 | | | | | | New York | | | | | | |
| 2 | | Policy Form | | | Policy Limits | | | Fire Deductibles | | | Wind Deductibles | |
| 3 | | Freq. Dist. | | | Freq. Dist. | | | Freq. Dist. | | | Freq. Dist. | |
| 4 | Type | 1996 | 1998 | Type | 1996 | 1998 | Type | 1996 | 1998 | Type | 1996 | 1998 |
| 5 | HO-1 | 0.3% | 0.3% | <100T | 24.2% | 18.0% | 100-250 | 80.0% | 70.0% | 100-250 | 79.9% | 69.1% |
| 6 | HO-2 | 18.6% | 19.6% | 101T-200T | 54.9% | 55.1% | 251-500 | 15.7% | 23.0% | 251-500 | 15.7% | 21.6% |
| 7 | HO-3 | 81.1% | 80.1% | 201T-300T | 13.6% | 18.3% | 501-1000 | 3.8% | 6.2% | 501-1000 | 3.8% | 5.7% |
| 8 | HO-5 | 0.0% | 0.0% | 301T-400T | 3.8% | 4.7% | 1000+ | 0.6% | 0.9% | 1000+ | 0.7% | 4.6% |
| 9 | HO-8 | 0.0% | 0.0% | 500T+ | 3.5% | 3.9% | | | | | | |

|    | A                | B       | C             | D     |
|----|------------------|---------|---------------|-------|
| 1  | New York         |         |               |       |
| 2  |                  |         |               |       |
| 3  |                  |         | Freq. Dist.   |       |
| 4  | H1               | Type    | 1995          | 1998  |
| 5  | Policy Form      | HO-1    | 0.3%          | 0.3%  |
| 6  | Policy Form      | HO-2    | 18.6%         | 19.6% |
| 7  | Policy Form      | HO-3    | 81.1%         | 80.1% |
| 8  | Policy Form      | HO-5    | 0.0%          | 0.0%  |
|    | ...              |         |               |       |
| 20 | Wind Deductibles | 251-500 | 15.7%         | 21.6% |
| 21 | Wind Deductibles | 501-1000| 3.8%          | 5.7%  |
| 22 | Wind Deductibles | 1000+   | 0.7%          | 4.6%  |

FIG. 2B

|    | A                | B       | C     | D           |
|----|------------------|---------|-------|-------------|
| 1  | New York         |         |       |             |
| 2  |                  |         |       | Freq. Dist. |
| 3  | H1               | Type    | H2    | H3          |
| 4  | Policy Form      | HO-1    | 1995  | 0.3%        |
| 5  | Policy Form      | HO-2    | 1995  | 18.6%       |
| 6  | Policy Form      | HO-3    | 1995  | 81.1%       |
| 7  | Policy Form      | HO-5    | 1995  | 0.0%        |
|    | ...              |         |       |             |
| 37 | Wind Deductibles | 251-500 | 1998  | 21.6%       |
| 38 | Wind Deductibles | 501-1000| 1998  | 5.7%        |
| 39 | Wind Deductibles | 1000+   | 1998  | 4.6%        |

FIG. 2C

|    | A                | B       | C     | D          |
|----|------------------|---------|-------|------------|
| 1  | New York         |         |       |            |
| 2  | H1               | Type    | H2    | Freq. Dist |
| 3  | Policy Form      | HO-1    | 1995  | 0.3%       |
| 4  | Policy Form      | HO-2    | 1995  | 18.6%      |
| 5  | Policy Form      | HO-3    | 1995  | 81.1%      |
| 6  | Policy Form      | HO-5    | 1995  | 0.0%       |
| 7  | Policy Form      | HO-8    | 1995  | 0.0%       |
|    | ...              |         |       |            |
| 36 | Wind Deductibles | 251-500 | 1998  | 21.6%      |
| 37 | Wind Deductibles | 501-1000| 1998  | 5.7%       |
| 38 | Wind Deductibles | 1000+   | 1998  | 4.6%       |

AUTOMATICALLY CONVERTING SPREADSHEET TABLES TO RELATIONAL TABLES

FIELD OF THE DISCLOSURE

The present disclosure relates generally to techniques to transform a complex hierarchical table into a relational table.

BACKGROUND

Spreadsheet applications are used by billions of users worldwide. The appeal of spreadsheet systems is two-fold. On the one hand, they can offer a flexible platform with almost no restrictions on the data representation. For example, users can arrange data in ad hoc layouts. An example representation of data is provided in the hierarchical table shown in FIG. 1. In FIG. 1, the layout of the table provides an intuitive comparison of frequency distributions across different years and insurance types. On the other hand, spreadsheet systems can also offer tools to operate on the data, such as sorting, filtering, querying, and charting. These features can improve the extraction and analysis of the essential information, which is of immense importance today when data mining is ubiquitous. Unfortunately, tools provided by a spreadsheet application or system are limited to strictly-formed relational tables, such as the example provided in FIG. 2C.

While a user can manually transform an ad hoc spreadsheet tables to a relational table, it is a time consuming and error-prone process, which may even result in removing essential relations or data. Furthermore, a manual transformation of a hierarchical table to a relational table is simply not realistic with tables that are large (e.g., at least 25 rows and/or columns). Given these problems, previous attempts have resulted in a few different approaches. One approach utilizes data cleaning tools that manipulate spreadsheet tables through predefined transformations. While such tools can provide a simplistic user interface, the user has to identify and select the transformations to be performed. Furthermore, the generality of the transformations and the fact that multiple instructions are required makes this task harder for the users, resulting in users failing to complete this task Another approach utilizes Domain-specific Languages (DSLs), which can offer syntax specialized for manipulating tables. While such DSLs can shorten the data cleaning process, it requires an end user to learn a programming language in order to utilize the DSL. This is a complex task for most end users. Another approach is to utilize automatic tools with additional assumptions as in the program. One example of this approach is FlashRelate, which assumes that the user can convey how to change the layout of the table with few examples. Another example of this approach is Senbazuru, which assumes that headlines are data pieces and that values not related. Thus, Senbazuru requires identification of the headline region to compute the relational tuples.

The above approaches, other than Senbazuru, can place the burden of understanding how to remove the hierarchy on the user. Senbazuru may eliminate some of this burden, but it only addresses a specific class of tables. Tables with related values or headlines that do not provide data cannot be transformed by Senbazuru. In practice, there are many such tables utilized by end users or database systems. Thus, there is a need to provide a technique that can transform a hierarchical table to a relational table that (1) is seamless to an end user (e.g., can be performed at the click of a button), and (2) is capable of operating on complex tables with potentially large data sets.

SUMMARY

According to an embodiment, a system is disclosed that includes a database that is communicatively coupled to a processor. The database may be configured to store one or more tables, at least one of which is a hierarchical table. The processor may receive the hierarchical table that includes one or more columns, one or more rows, one or more headlines, and one or more values. The table may be stored in the database or in temporary storage. The processor may identify a headline row in the hierarchical table. The headline row may refer to at least one cell that spans greater than one column of the hierarchical table, but not all columns containing data in the hierarchical table. The processor may determine a candidate row for each of the one or more columns of the hierarchical table. The candidate row may correspond to a first row that has content similar to at least one cell below the first row. The first row may be selected, for example, based upon a majority of the one or more columns of the hierarchical table returning that the first row has content to at least one cell below the first row.

The processor may perform a series of steps. First, beginning with a leftmost cell in the headline row, the processor may classify each headline in the headline row as a data headline or a descriptor headline by determining whether the leftmost cell has similar content to its neighbor in the headline row. If the leftmost sell has similar content, it may be classified as a data headline; otherwise it may be classified as a descriptor headline. The determination of similarity of content of the first row to the at least one cell below the first row or the determination of similarity of content of the leftmost cell to its neighbor in the headline row may be based upon a Needleman-Wunsch string edit distance metric and/or using a threshold value. Other algorithms may be applied to determine similarity of content in one cell, row, and/or column, to that of another cell, row, and/or column. A second part of the process may include generating a new column for each data headline classified as a data headline, and for each headline classified as a descriptor headline, split the table vertically after the each descriptor headline thereby producing a resultant table. Third, in some instances, the resultant table may be stored to the database. Fourth, steps one to three may be repeated on the resultant table until there are no headlines classified as data headlines in the resultant table. In some configurations, one or more primary keys are determined in the resultant table.

In some configurations, the processor may output a synthesized program that includes a computational description of each adjustment to the hierarchical table to obtain the resultant table. The output program may utilize a DSL. In some configurations, the system may display the resultant table on a user device in responsive to a user's request. Input from the user to modify the program output by the system may be applied to the resultant table. For example, the system may process the resultant table again with the input applied by the user according to the process disclosed herein.

The system may also determine that the hierarchical table is not in a canonical form. The processor of the system may undertake one or more remedial measures to place the table in canonical form. Examples of a remedial measure can include deleting an empty row, deleting an empty column, and shifting one or more cells.

In an implementation, a computer-implemented method is provided. A hierarchical table may be received that includes one or more headlines, one or more values, one or more rows, and one or more columns. A headline row may be identified in the hierarchical table. The headline row may refer to at least one cell that spans greater than one column of the hierarchical table, but not all columns containing data in the hierarchical table. A candidate row may be determined for each of the one or more columns of the hierarchical table. The candidate row may correspond to a first row that has content similar to at least one cell below the first row. The first row may be selected, for example, based upon a majority of the one or more columns of the hierarchical table returning that the first row has content to at least one cell below the first row.

A series of steps may be performed. First, beginning with a leftmost cell in the headline row, each headline in the headline row may be classified as a data headline or a descriptor headline by determining whether the leftmost cell has similar content to its neighbor in the headline row. If the leftmost sell has similar content, it may be classified as a data headline; otherwise it may be classified as a descriptor headline. The determination of similarity of content of the first row to the at least one cell below the first row or the determination of similarity of content of the leftmost cell to its neighbor in the headline row may be based upon a Needleman-Wunsch string edit distance metric and/or using a threshold value. A second part of the process may include generating a new column for each data headline classified as a data headline, and for each headline classified as a descriptor headline, split the table vertically after the each descriptor headline thereby producing a resultant table. Third, in some instances, the resultant table may be stored to, for example, a database or memory. Fourth, steps one to three may be repeated on the resultant table until there are no headlines classified as data headlines in the resultant table. In some configurations, one or more primary keys may be determined in the resultant table.

In some configurations, a synthesized program may be output that includes a computational description of each adjustment to the hierarchical table to obtain the resultant table. The output program may utilize a DSL. In some configurations, the resultant table may be displayed on a user device in responsive to a user's request. Input from the user to modify the program output by the system may be applied to the resultant table. For example, the resultant table may be processed again with the input applied by the user according to the process disclosed herein.

It may be determined that the hierarchical table is not in a canonical form. One or more remedial measures may be undertaken to place the table in canonical form. Examples of a remedial measure can include deleting an empty row, deleting an empty column, and shifting one or more cells.

In an implementation, a non-transitory computer readable medium is disclosed that may have stored thereon computer readable instructions that may be executable to cause one or more processors to perform operations. The process may include receiving a hierarchical table that includes one or more headlines, one or more values, one or more rows, and one or more columns. A headline row may be identified in the hierarchical table. The headline row may refer to at least one cell that spans greater than one column of the hierarchical table, but not all columns containing data in the hierarchical table. A candidate row may be determined for each of the one or more columns of the hierarchical table. The candidate row may correspond to a first row that has content similar to at least one cell below the first row. The first row may be selected, for example, based upon a majority of the one or more columns of the hierarchical table returning that the first row has content to at least one cell below the first row.

A series of steps may be performed by the one or more processors based upon the instructions stored to the computer readable medium. First, beginning with a leftmost cell in the headline row, each headline in the headline row may be classified as a data headline or a descriptor headline by determining whether the leftmost cell has similar content to its neighbor in the headline row. If the leftmost sell has similar content, it may be classified as a data headline; otherwise it may be classified as a descriptor headline. The determination of similarity of content of the first row to the at least one cell below the first row or the determination of similarity of content of the leftmost cell to its neighbor in the headline row may be based upon a Needleman-Wunsch string edit distance metric and/or using a threshold value. A second part of the process may include generating a new column for each data headline classified as a data headline, and for each headline classified as a descriptor headline, split the table vertically after the each descriptor headline thereby producing a resultant table. Third, in some instances, the resultant table may be stored to, for example, a database or memory. Fourth, steps one to three may be repeated on the resultant table until there are no headlines classified as data headlines in the resultant table. In some configurations, one or more primary keys may be determined in the resultant table.

In some configurations, the computer readable medium may have instructions that direct the one or more processors to output a synthesized program that includes a computational description of each adjustment to the hierarchical table to obtain the resultant table. The output program may utilize a DSL. In some configurations, the resultant table may be displayed on a user device in responsive to a user's request. Input from the user to modify the program output by the system may be applied to the resultant table. For example, the resultant table may be processed again with the input applied by the user according to the process disclosed herein.

It may be determined that the hierarchical table is not in a canonical form. One or more remedial measures may be undertaken to place the table in canonical form. Examples of a remedial measure can include deleting an empty row, deleting an empty column, and shifting one or more cells.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

FIG. 1 is an example of a hierarchical table that includes a title (e.g., "New York"), one or more headlines, and one or more values, according to a disclosed implementation.

FIG. 2A is an example of a resultant table obtained from the hierarchical table illustrated in FIG. 1 according to the disclosed implementations herein.

FIG. 2B is an example of a resultant table obtained after further processing the table shown in FIG. 2A according to an implementation disclosed herein.

FIG. 2C is an example of a relational table obtained by transforming the hierarchical table of FIG. 1 according to an implementation disclosed herein.

DETAILED DESCRIPTION

Figure 3:
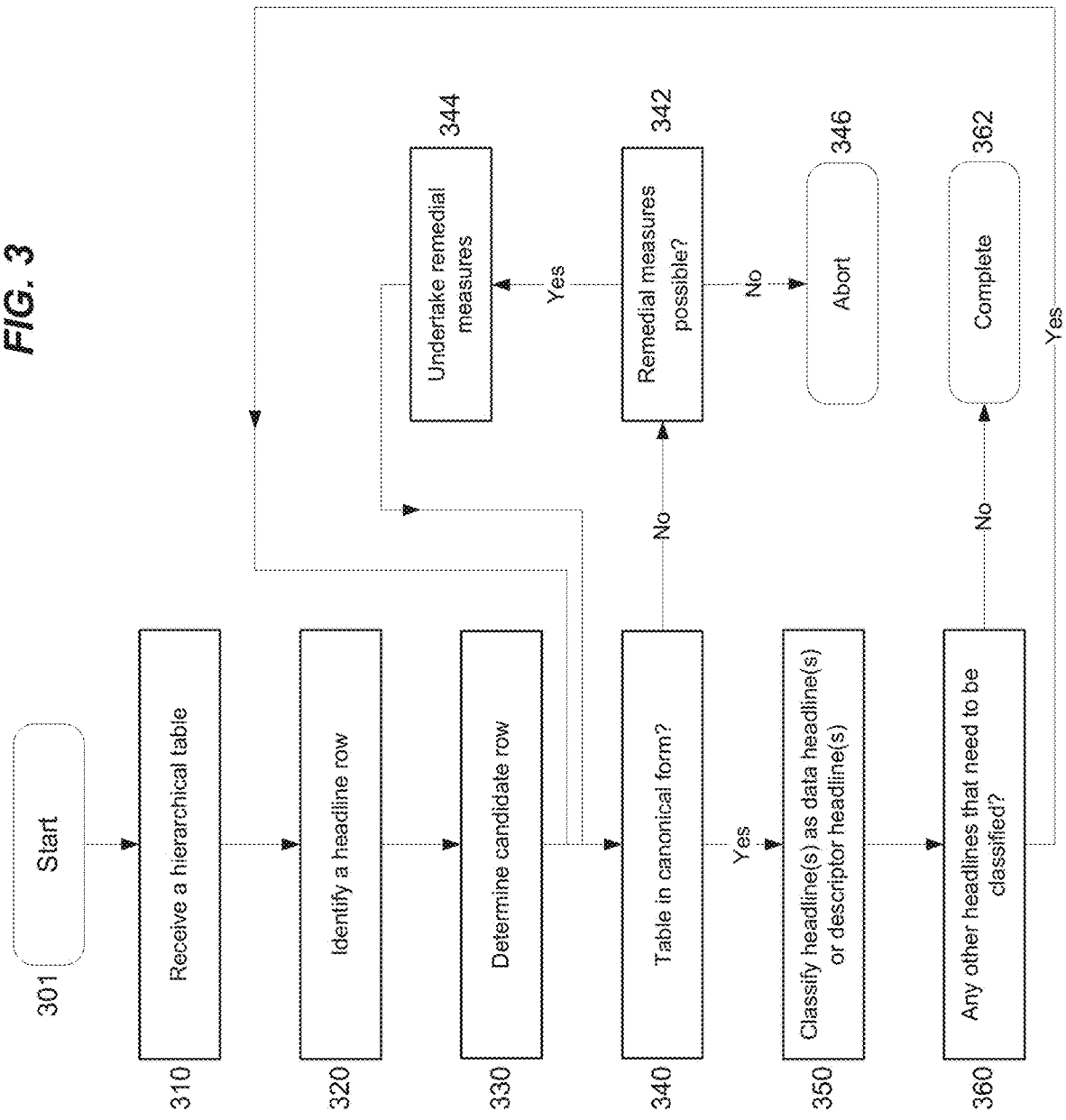
FIG. 3 is an example of the process to transform a hierarchical table to a relational table including transforming the table to a canonical form if necessary, according to implementations disclosed herein.

Disclosed are techniques for transforming a hierarchical table to a relational table. Relational tables, such as the example provided in FIG. 2C, can be strictly-formed, which can refer to value rows representing relational tuples, having headlines in one row, and having headlines as descriptors. In contrast, in hierarchical tables, such as the example provided in FIG. 1, rows may contain values that are not related, but are only compared to one another. For example, in the hierarchical table shown in FIG. 1, the values in columns B and C are unrelated to one another. In addition, in a hierarchical table, headlines may span multiple rows such as rows 2-4 in FIG. 1. Finally, in a hierarchical table, headlines may contain data such as "Policy Form" and "1995" in FIG. 1.

Disclosed herein are techniques to transform a hierarchical table into a relational table. Subsequent to this transformation, it can be determined whether modified layouts of hierarchical tables preserve their relational information. Accordingly to an implementation disclosed herein, for every table there exists a classification of the headlines to data (e.g., "1995" in FIG. 1) and descriptors (e.g., "Type" in FIG. 1), and this can determine the relational information. As shown by the examples provided herein, the disclosed implementations capture the relations as well as those intuitively captured by end users. Furthermore, the disclosed implementations provide clear advantages over Senbazuru. If headlines are assumed to provide data, then values are not related, which is an assumption made by Senbazuru. Moreover, tables that contain related values or headlines that are not data values cannot be supported by Senbazuru.

There are at least two challenges that are addressed by the disclosed implementations that previous efforts fail to resolve with regard to transforming a hierarchical table to a set of relational tables and preserving its relational information. For example, transforming the example hierarchical table in FIG. 1 to the example shown in FIG. 2C. One challenge can be the identification of a headline region which is helpful to understand what cells of the table correspond to hierarchical headlines. A second challenge can be classification of headlines to data or descriptors to determine the table's relational information, which can guide construction of the relational tables.

As disclosed herein, to identify the headline region of a hierarchical table, the system can determine (1) values in the same column are drawn from the same universe, and (2) elements from the same universe are often syntactically similar. Thus, where a headline region ends can be determined by finding the first row whose values are syntactically similar to the values below. As disclosed herein, to classify headlines, the system can determine that data headlines are typically part of a group of data headlines from the same universe and, thus, are likely to be syntactically similar. Consequently, as disclosed herein, headlines can be classified by syntactically comparing them to their neighbors. String similarity can be estimated by, for example, a modified version of the Needleman-Wunsch algorithm.

According to an implementation, the system can transform a hierarchical table to one or more relational tables that preserve the relational information. The system can identify a headline region, and then gradually remove the hierarchy formed by the headlines. Headlines can be examined systematically from top to bottom and from left to right. The system can ignore titles. A title can refer to cells at the headline region that cover all cells below. For example, in FIG. 1, "New York" is identified as a title. Given a headline, the system can determine whether the headline is at the beginning of a data headline sequence. If so, it can classify all of the headlines in the sequence as data headlines, extend the table with a fresh column for them, and add an artificial headline. For example, in FIG. 1, row 2 is identified as containing headlines as is row 4. In this example, a column is added to the transformed table that contains the headlines for row 2 and another column is added that contains the headlines for row 4 (see, e.g., columns A and C in FIG. 2C). If the headline is not at the beginning of a data headline sequence, the system can classify the headline as a descriptor and vertically split the table after it, thereby making it a title as explained below.

As disclosed herein, the operations performed by the system can be phrased as intuitive instructions that form a high-level language specialized for modifying tables to relational tables. The disclosed implementations can output a program over this language. An end user can observe this output to understand the process the system has taken and edit the process to fix easily any mistakes the system may have made in its classification of the data within the table and/or transformation of the table. Because the system synthesizes programs from input only, without any additional specification, it can be an instantiation of a predictive program synthesizer. Thus, disclosed herein is a DSL for transforming tables to relational tables. The DSL can define the system's operations and enable users to review the manipulation process.

To ascertain the robustness and accuracy of the disclosed implementations, 80 real-world spreadsheet tables were processed according to implementations disclosed herein. As explained below, the system identified the headline region correctly in 98% of these tables. In contrast, Senbazuru identified the headline region correctly in 75%. The disclosed classification to data and descriptor headlines obtained recall and precision of 0.96 in the examples provided below. Furthermore, the disclosed system was measured for its success in providing an end-to-end transformation based upon how many fixes were required to recover from mistakes. As explained below, 70% of the example tables were successfully transformed end-to-end, and 91% of the tables were successfully transformed with up to one fix. Moreover, the disclosed implementations completed such transformations rapidly, averaging within two seconds.

The relational information of hierarchical tables can be determined by the headlines' types. These types can capture what headlines are related to the values they annotate and what headlines are related to one another. Headlines can be related if they provide different types of information. If headlines are not related, but provide the same type of information, then their values are also not related (but compared). If a headline is related to its values, it can be referred to as a data headline; otherwise, it can be called a descriptor. If two headlines are not related, they can be called same universe headlines; otherwise, they can be called different universe headlines.

For example, in FIG. 1, "Policy Form," "Policy Limits," "Fire Deductibles," and "Wind Deductibles" are data headlines from the same universe (they provide the insurance type); "1995" and "1998" are data headlines from the same universe (they provide the year); and "Freq. Dist." and "Type" are descriptors (they do not add information to the values below). "Policy Form" and "1995" are different universe headlines as they provide different types of information.

The example provided in FIGS. 1 and 2A-2C show one possible way to classify the headlines in the FIG. 1 table, which can be a more natural classification. However, the headlines can be classified differently, thereby expressing different relations between the cells. The headline classifications can be used to capture all possibilities to split cells to relational tuples: data/descriptor headlines can capture the headlines that are related to the values and same/different universe headlines can capture the values that are related. This renders the disclosed system more robust compared to other systems.

As mentioned, once the headlines are classified, the system can compute the relational information. In this regard, the disclosed system can be a classifier. Traditionally, classifiers train models based on classified corpora. However, as described below, the structure of the table and its content can be sufficient to guide the classification. This can yield two advantages. First, the system does not require large, classified corpora and, consequently, it does not need be updated over time or across multiple languages. Second, this classification can be communicated to the user. In contrast, learning models typically have complex explanation that cannot be communicated to and/or understood by the end user.

After classifying a headline, the system determines how to alter the hierarchical table such that the hierarchy is removed, but the headline's relations are unaffected. This can involve two processes. In some instances, the table can be extended with a column containing the identified headline (e.g., "Policy Form" in FIG. 2A). In other instances, the table can be vertically split into two tables, such that this headline becomes the title of the table containing it. For example, in FIG. 1, the hierarchical headline "Policy Form" can be removed and the table in FIG. 1 can be split into two tables. One table can contain the values at columns A-C, and the other table can contain the values at columns D-L. For the system to perform splitting based on a headline, two it can be determined that: (i) the headline cell is classified as a descriptor, and (ii) there are more headlines below that cell (i.e. the headline cell is not in the last headline row). For the example, the "Policy Form" headline (A-C) is determined to be similar to "Policy Limits" headline using the specified threshold, so it can be classified as a data headline and not as a descriptor, Thus, the system may not split the tables into A-C and D-L tables. In the table illustrated in FIG. 2B, headline H1 may be classified as a descriptor headline, but the table still may not be split because there is no headline below H1. Thus, under the aforementioned two processes of extending and splitting the table, data headlines can be re-positioned to be part of the value rows, while descriptors can remain at the headline region. In addition, same universe headlines can be in the same column. Thus, values providing the same type of information can be in the same column, as customary in relational tables.

Generally, due to locality reasons it can be easier to classify outer headlines, which can refer to headlines with row number values beneath them. For example, data headlines from the same universe are likely to be consecutive if they are the outer headlines. As an example, in FIG. 1 "Policy Form" and its right neighbors in the row are adjacent, while the occurrences of "1995" and "1998" are not (e.g., "Type" intervenes each pair of "1995" and "1998"). Thus, instead of defining rules to classify all headlines in all locations, which is more complex and potentially less robust, the system can operate based upon rules to classify the leftmost outer headline. Thus, the system performed classification gradually. That is, at each step it can classify the leftmost outer headline, then it can pick a hierarchy removal step, and execute it. Then, an unclassified headline can become the new leftmost outer headline, and it can be classified by system. Thus, the disclosed system is a special kind of a program synthesizer because (1) it gradually constructs the program (i.e., the list of steps), and (2) after synthesizing an instruction, it can execute this program on the current table(s). The result can allow the system to determine the next instruction.

In addition to the relational tables that can be output, the system can output the program it synthesized to transform the table. An end user can then reason about the process the system has taken, both by examining the instructions in the DSL, and by examining the intermediate tables generated by the synthesized program instructions. The user can also easily fix instructions, if system has made any mistake, re-execute the system (e.g., with the user-identified fix) and obtain the correct outcome.

An example of the disclosed system is now provided with regard to the hierarchical table provided in FIG. 1 and the intermediate tables provided in FIGS. 2A and 2B. The end result of the transformation is illustrated in FIG. 2C.

The disclosed system can perform the following processes, as illustrated in the example provided in FIG. 3: (1) detect the headline region, (2) determine if the headline region is in a certain canonical form (if not, it fixes it) as described below, and (3) iteratively perform the following two processes: (i) choose and execute a single modification of splitting the table or generating a fresh column, and (ii) determine if this resulted in a non-canonical table and, if so, fix it. Ensuring that tables are canonical enables can simplify the rules needed to determine the headlines' classification. These steps are explained in detail below.

The process can start 301 with the receipt of a hierarchical table at 310. For example a user may have such a table in a spreadsheet program, or a stored copy of the hierarchical table may be stored to a computer readable medium that is accessible to a processor which is capable of executing the processes disclosed herein. In some implementations, the table may be provided over a network (e.g., from a remote source).

The headline region can be detected or identified at 320. To detect the row where the value region begins, the system can operate with the assumption that typically hierarchical tables have at least one headline row whose cells span single columns (otherwise two columns would have the same headline and would be indistinguishable). For example, row 4 of FIG. 1 is a headline row whose cells span single columns. Thus, the system proceeds to examine the row beneath the headline row to look for the value region (e.g., row 5 in FIG. 1). The system can compute for each column a candidate row at 330. The candidate row of a column can be the first row whose content is similar to at least one cell below. The system can return the candidate with the highest number of votes (ties are broken by choosing the smallest row). For example, in FIG. 1, the candidate for column A is 5, since "HO-1" is similar to "HO-2," while for column D, 6 is picked since "<100T" is not similar enough to the cells below, but "101T-200T" is. The method by which similarity between candidates is determined is described later. The system can determine that the value region begins at row 5, since all columns, except for D, voted for 5.

Next, the system can format the table to a canonical form at 340. A canonical form can refer to one that has: (i) no empty rows or columns, (ii) cells below a cell spanning multiple columns are contained in its merged region (e.g., the cells below "Policy Form" are contained in its merged region that spans three columns), and (iii) directly below headlines there is at least one (non-artificial) headline, unless the headline is at the last headline row (e.g., in FIG. 2B "Freq. Dist." violates this). The system can fix the violations by removing empty row and columns, swapping two consecutive rows, and shifting cells to one row below at 344. If the system cannot fix the violations at 342, it can abort the process at 346. In the example provided herein, the table in FIG. 1 is already canonical form.

Figure 4:
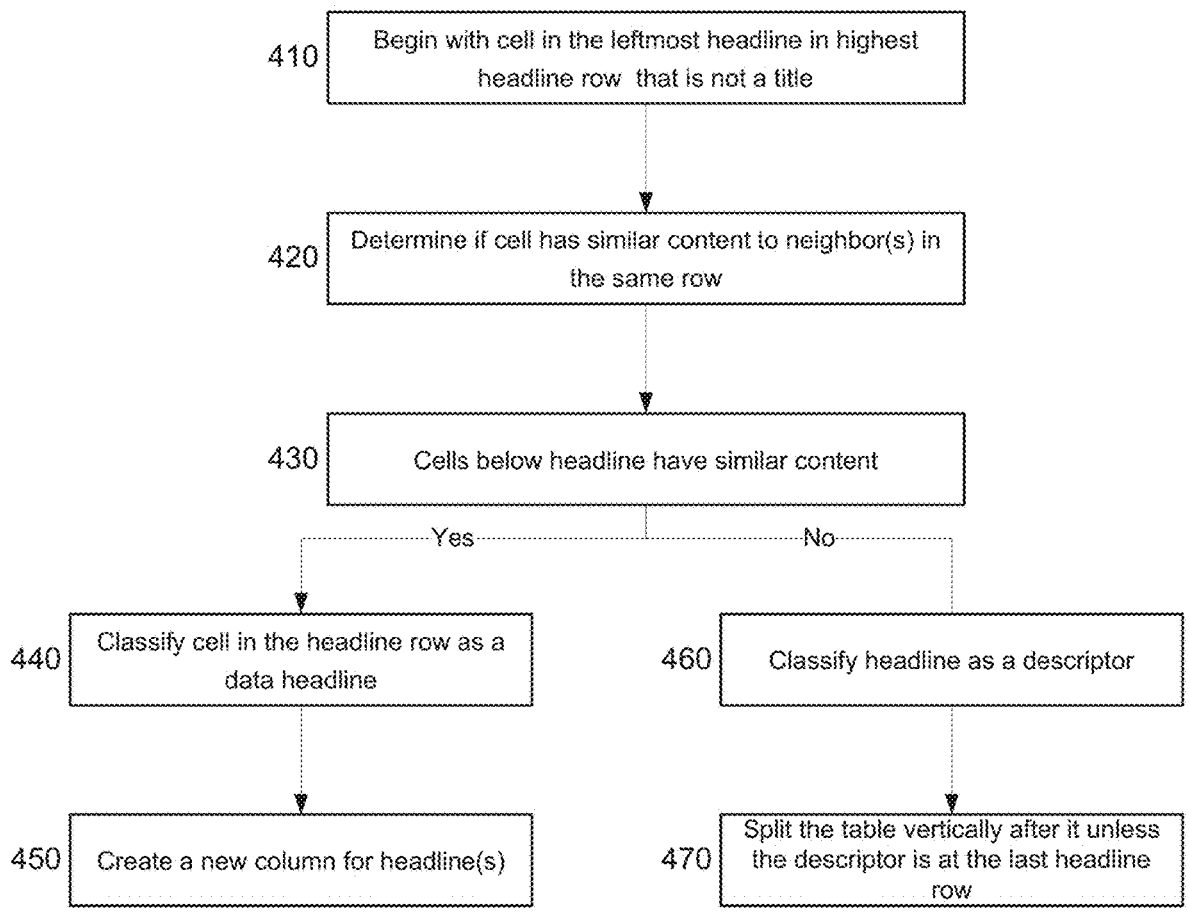
FIG. 4 is an example of the process to classify one or more headlines according to an implementation disclosed herein.

Next, the system can scan the table to perform a hierarchy removal step at 350. If there are no steps at 360, it completes at 362. To this end, an example of the process of the hierarchy removal step is illustrated in FIG. 4, the system can examine the leftmost headline in the highest headline row that is not a title (i.e., does not cover all of the table) at 410, and can classify it as a data headline or a descriptor. To classify a headline, the system can determine whether a cell in the headline row has a similar content as its neighbors in the same row at 420, and whether the content of the cells below each headline in the headline row is similar, too at 430. If so, the headline can be classified as a data headline of the same universe at 440. Then, the system can create a new column for the identified data headlines, annotated with an artificial headline at 450. Otherwise, the system can classify a headline as a descriptor at 460 and split the table vertically after the descriptor headline at 470. If the descriptor is at the last headline row and thus does not introduce hierarchy, then the table may not be vertically split. The process is explained in greater detail below. The order of these steps can be interchangeable or simultaneous.

In the example provided in FIG. 1, the first headline classified is "Policy Form" ("New York" is a title). The system can determine that it is syntactically similar to "Policy Limits" and the cells below them (e.g., "Freq. Dist.," "Type," "1995," "1998," and the values below them) are syntactically similar, too. Thus, the system can proceed to the next headline in the headline row, e.g., "Fire Deductibles" and "Wind Deductibles," which are also similar. Thus, the system can create a new column for them as shown in FIG. 2A.

A hierarchical table may have one or more primary keys, which can refer to a unique identifier of the row. Primary keys are typically at the leftmost columns. For example, the primary key columns in FIG. 2C are columns A and B, while FIG. 1 has no primary keys since the leftmost columns are not related to the values after column C. Primary keys may not be separated from the other columns and they can be copied to both tables upon a split. Thus, after classifying a headline as a descriptor, the system can determine the one or more primary key columns, and decide how to proceed accordingly.

Returning to the example, the system can remove the empty row and look for the second hierarchy removal step. That is, the system can determine whether there are any other headlines that need to be or can be classified at 360. If not, the system may store the resultant relational table(s) and/or synthesized program. In some configurations, the system may display or otherwise output one or more of the resultant tables and/or the synthesized program. At 360, the system can classify the leftmost headline, which is "Freq. Dist." Since it is not followed by headlines, it can be classified as a descriptor (e.g., a descriptor headline). To decide whether to split the table, the system can compute the primary key columns, and determine that in this example, columns A-B correspond to the primary keys. Thus, the system can determine that this headline is a title. The system then can examine the next leftmost outer headline, "H1." "H1" is classified as a descriptor (since it is an artificial headline), but the table does not split since "H1" is in the last headline row. Next, "Type" is treated the same. Then, the system can examine "1995." "1995" and "1998" and the cells below each of "1995" and "1998" are syntactically similar. Thus, the system can generate a fresh column as illustrated in the table shown in FIG. 2B. Now, "Freq. Dist." violates condition (ii) of the canonical form, and the system can fix it by overriding "H3." Finally, the system can remove the empty row at row 2 as illustrated in FIG. 2C. At this point, there are no more steps. The system can proceed to the complete step at 362. As a part of this process, the system can, for example, output a synthesized program and/or display the resultant table on a user's device. Thus, the system can, for example, output the resultant table and/or the synthesized program:

Create Column(T,A2,3);
Remove Row(T,2);
Create Column(T,C3,1);
Shift Cell(T,D2);
Remove Row(T,2);

The program communicates to the user that for this example the system: (i) created a column for cells A2-A6, (ii) removed the row 2, (iii) created a column for cells C3-C4, (iv) shifted the cell at D2 to the row below, and (v) removed row 2. A user can manually edit the synthesized program to achieve the desired result. Upon receipt of a modification (e.g., a user input), the modification can be applied to the resultant table and the process can be run anew at step 301.

The computational characterization of a hierarchical table and/or algorithms that perform the various comparisons, determinations, and classifications described above are now explained in greater detail below.

A table can be modeled as a function mapping row-column pairs (cells) to the content and boundaries of the cell at this location: $T:[i_{MR}]\times[j_{MC}]\rightarrow C\times[i_{MR}]\times[j_{MC}]\times[i_{MR}]\times[j_{MC}]$, where $i_{MR}$, $j_{MC}$ are the maximal row and column in the table T ($[n] \triangleq \{1 \ldots n\}$). Formatting features of cells can be ignored. Given a tuple $T(i,j)=(c, i^B, j^B, i^E, j^E)$, c can refer to the cell's content, $i^B$, $i^E$ can be the rows where the cell region begins and ends, respectively, and $j^B, j^E$ can be defined similarly for the columns. Cells cannot overlap other cells. For a cell i, j the tuple elements can be referred to by $c_{T,i,j}$, $i_{T,i,j}^B$, etc. When it is clear from the context, T can be omitted.

Tables that can be processed according to implementations disclosed herein can have a headline region that is only at the top of the table. That is for a table T there may exist a row $i_T$, such that cells at rows smaller than $i_T$ are at the headline region and the rest are at the value region. Cells at the headline region whose merged region covers all columns of the table can be called titles. Other cells in the headline region can be referred to as headlines. Cells at the value region can be referred to as values. For example, in FIG. 1, $i_T$=5, "New York" is a title, the cells at rows 2-4 are headlines, and the rest are values.

In row-oriented tables, cells in the value region may be related to values in the same row, but not to values in the same column.

Tables may have primary keys. Primary keys can be values that are related to all values in their row and they can be a unique identifier of their row. Primary keys may have multiple consecutive columns, starting from the leftmost column. The number of primary key columns can be minimal: if $j_p$ is the last primary key column, then $j_p=1$ or for $0<j'<j_p$, there are two rows in the value region whose content in columns $1 \ldots j'$ is identical. For example, in FIG. 2A, $j_p=2$, in FIGS. 2B and 2C, $j_p=3$, and FIG. 1 does not have primary keys since the values at the leftmost columns are not related to values in columns greater than 3.

Figure 5A:
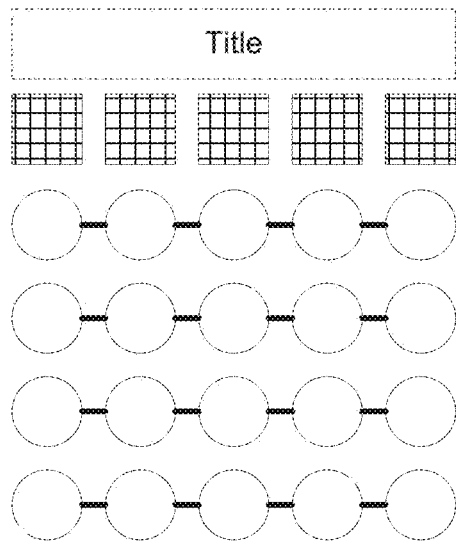
FIG. 5A is an example of a relational table that has one row of headlines, each spanning a single column, as disclosed herein.
Figure 5B:
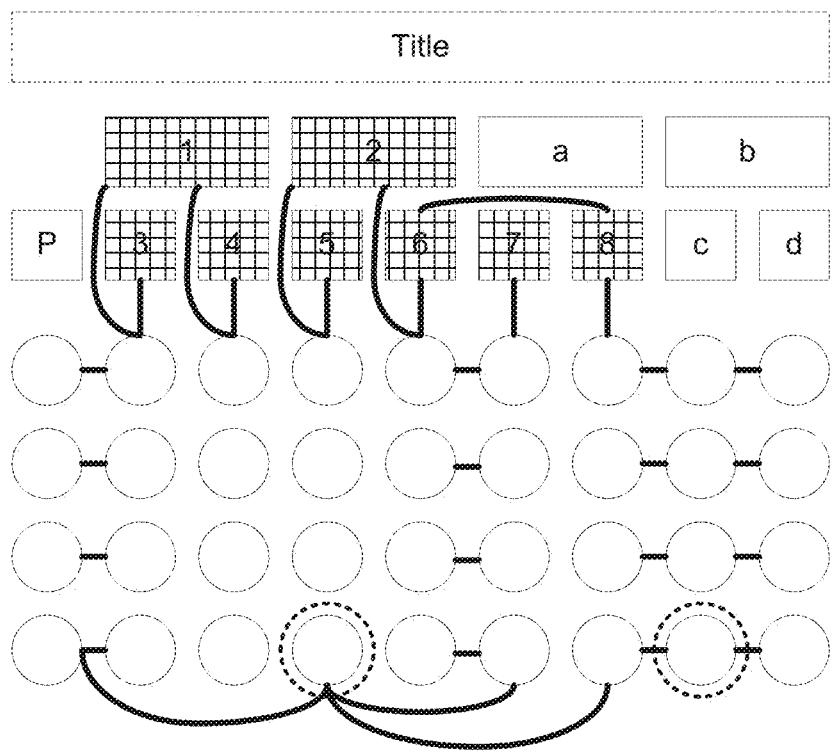
FIG. 5B illustrates an example of a hierarchical table that can have one or more headlines over or below two other headlines at the same row, as disclosed herein.
Figure 6:
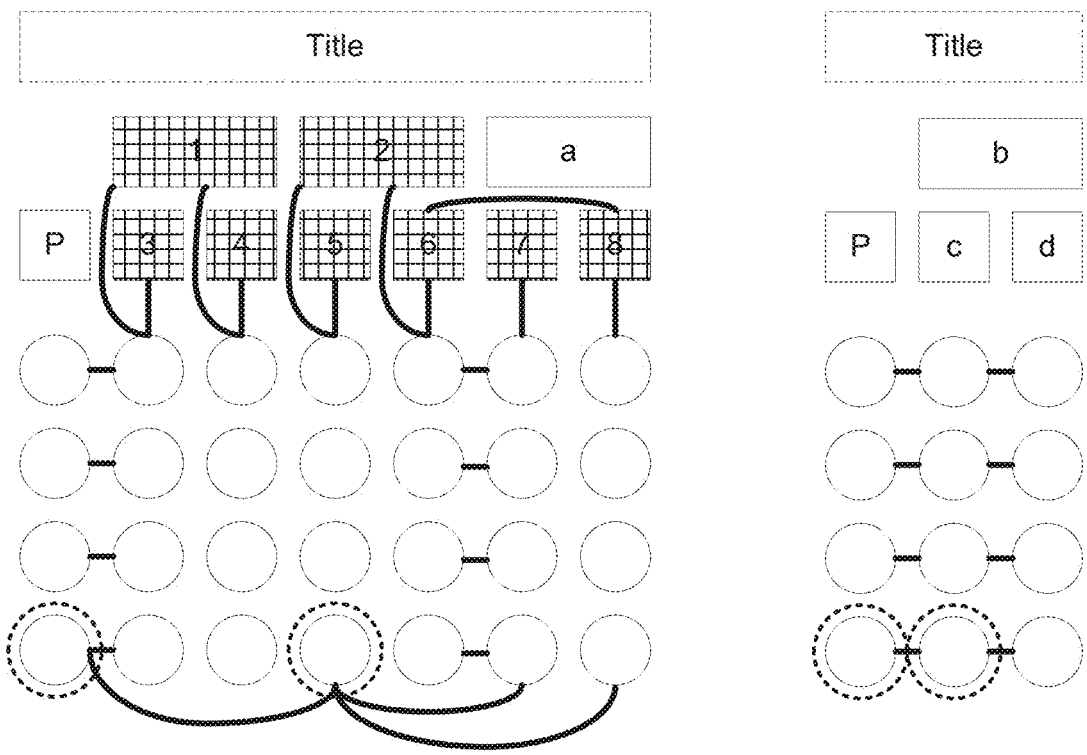
FIG. 6 illustrates an example of the relation of values in different tables according to implementations disclosed herein.

A relational table can be a table that has one row of headlines, each spanning a single column (e.g., FIG. 5A). A hierarchical table can have at least one headline over or below two other headlines at the same row (e.g., FIG. 5B). The semantic relation of tables can be illustrated by the black lines shown in FIGS. 5A and 5B. The connections between different values denote they are related and should be present together in a tuple in the final relational table. To avoid clutter, some relations are omitted, including the pairs {3, 4, 5}×{7, 8}, the value pairs below them, and the pairs having a numbered headline and a value below it. In FIGS. 5A, 5B, and 6, the numbered rectangles can denote data headlines and lettered rectangles can denote descriptor headlines. The following headline pairs are presumed to be from the same universe: (1,2), (3,4), (5,6) and (7,8). The Table illustrated in FIG. 6 denotes a transformed tabled obtained from Table illustrated in FIG. 5B according to an implementation disclosed herein. The dotted circles show how the relational information in the last row is still preserved in Table in FIG. 6 after splitting into two tables by copying the primary key column P in the second table.

The relational information of a relational table can be a relation whose tuples are formed by values in the same row. FIG. 5A illustrates an example of a relational table: headlines (cross-hatched boxes) can describe the values, and the values (circles) in each row are related. However, in hierarchical tables (e.g., FIG. 5B), headlines may be related to the values below them, in which case they are part of the relational tuples (e.g., "1995" in FIG. 1) and values in the same row are not necessarily part of the same tuple (e.g., the values below "1995" and "1998" in FIG. 1 are not related but compared to one another). To model these new relations between cells, new headline types can be introduced. Based on these new headline types, when two cells are related can be formally defined. This definition can allow construction of the relational tuples of hierarchical tables.

The possible relations of cells in hierarchical tables can be modeled via two headline types: Descriptors and data headlines: headlines that are part of the tuples can be referred to as data headlines, others can be referred to as descriptors.

Two headlines that provide the same type of information but a different instance of it (e.g., "1995" and "1998" in FIG. 1) can be called same universe headlines. Otherwise, they can be called different universe headlines (e.g., "Type" and "1995"). The definition implies that: (i) same universe headlines are data headlines (e.g., they add information), and (ii) values at the same row that are below two same universe headlines are not related (because for the same type of information, each is related to a different instance).

The hierarchical table in FIG. 5B illustrates an example of these terms and the relations they introduce. Numbered rectangles are data headlines in FIG. 5G while lettered rectangles are descriptors. Some headlines are from the same universe: (i) 1,2, (ii) 3,4, (iii) 5,6, and (iv) 7,8. The other pairs are different universes.

The classification can satisfy that if two headlines are from the same universe, other headlines are from their universe or different from both. Given a classification of the headlines to descriptor/data headlines and same/different universe headlines, the relational information of the table can be determined. To formalize it, the semantic relation containing tuples of related cells can be defined, and then construction of the relational tuples from this relation is explained.

The semantic relation $R^T$ of a table T can contain string pairs $(c_1, c_2)$ such that there exists row-column indices $(i_1, j_1)$, $(i_2, j_2)$ mapped to these contents $(c_{i_1,j_1}=c_1, c_{i_2,j_2}=c_2$ and:
- $(i_1, j_1)$ is a data headline, $(i_2, j_2)$ is a value $(i_2 \geq i_T)$, and $c_1$ vertically covers $c_2 (j_{i_1,j_1}^B \leq j_{i_2,j_2}^B \leq j_{i_2,j_2}^E \leq j_{i_1,j_1}^E)$.
- $(i_1, j_1)$, $(i_2, j_2)$ are values at the same row not vertically covered by two (different) same universe headlines.

To illustrate the above semantic relation, consider the table in FIG. 1. In this example, (1) (Policy Form, 0.3%) $\in R^T$: "Policy Form" is a data headline, vertically covering the value "0.3%," (2) (HO-1, 0.3%)$\in R^T$ illustrates that both values are at the same row and are not covered by two (different) same universe headlines, (3) (0.3%, 0.3%)$\notin R^T$: these values are below two different same universe headlines ("1995" and "1998"), (4) (HO-1, <100T)$\in R^T$: for the same reason (they are below "Policy Form" and "Policy Limits"), and (5) "Freq. Dist." and "Type" are descriptors and thus do not belong to any pair in $R^T$.

Next, construction of the relational tuples from the semantic relation is described in greater detail. This can allow definition of when a set of tables preserves another table's relational information by focusing on the semantic relations. Relational tuples can be constructed in three steps: (i) define sets of related values, then (ii) define sets of related cells (including headlines), and (iii) sort these sets to tuples.

A maximal value subset $S_v$ can satisfy that: (i) $S_v$'s elements are related values: $\forall c_1, c_2 \in S_v: c_1, c_2$ are contents of cells in the value region and $(c_1, c_2) \in R^T$, and (ii) $S_v$ is maximal: $\forall c \notin S_v, \exists c' \in S_v, (c, c') \notin R^T$. For example, some maximal value subsets of the table in FIG. 1 are: {HO-1, 0.3%}, {<100T, 24.2%}. Extending them with additional values can result in adding values from a different row or below a different same universe headline. For example, 0.3% in C5 cannot be added to the first set since it is below "1998." Similarly, the values to the right of "1998" cannot be added, since they are below different insurance type headlines.

A related cell set can be the union of the maximal value subsets with data headlines that are related to at least one of the values in the subset. That is, S can be a set of related cells if there exists a maximal value subset $S_v$ such that: $S=S_v \cup \{c|c$ is a data headline and $\exists c' \in S_v, (c,c') \in R^T\}$. Returning to the example, some related cell sets are: {HO-1, 0.3%, 1995, Policy Form}, {<100T, 24.2%, 1995, Policy Limits}.

Lastly, the tuples can be formed by sorting the elements of the related cell sets first by the column, then by the row. Namely, values can appear in their order, and data headlines can appear before their values. In the example illustrated by FIGS. 1 and 2A-2C, this can result in the tuples (Policy Form, HO-1, 1995, 0.3%), (Policy Limits, <100T, 1995, 24.2%).

As described above, according to implementations disclosed herein, a hierarchical table T can be transformed into a set of relational tables, S, preserving T's relational information. Having described relational tables, hierarchical tables, and the relational information of both tables (the semantic relation of a relational table can be defined identically, i.e., it can contain pairs of values from the same row), when a set of relational tables preserves the relational information of a given hierarchical table can be described.

Since the relational information can be defined by the tuples in the semantic relation, preserving the information is to have exactly the same tuples in the semantic relations. That is, at a first glance, it may be desirable to define $R^T = (\cup_{T' \in S} R^{T'})$. However, to remove hierarchy related values may be split over two tables. In this case, their relation can be preserved by having the same unique identifier (i.e., the primary keys). Thus, S can preserve the relational information of T if $R^T = (\cup_{T' \in S} R^{T'})+$. That is, the semantic relation of T can be equal to the transitive closure of the union. FIG. 6 illustrates an example of the relation of values in different tables. Note that this definition technically does not require copying all primary key columns (but just one of them). However, since users can examine the values, the system can copy all primary key columns to enable users uniquely identify the relations.

Next, the DSL for transforming hierarchical tables to relational tables is described. Programs in this DSL can be sequences of six instructions. The Split and CreateColumn instructions can be the hierarchy removal steps described earlier, and the other instructions can be enabled to fix tables returned by the former instructions, if they are not canonical, and also can fix the input table, if it is not canonical.

Create Column(T, (i,j), n): Create a column in T for the cell at (i,j) and to the next n headlines to its right. Duplicate headlines can be removed. Values below the n headlines can be moved to new rows. Values below other headlines can be copied to the new rows.

Split(T, c, $pk_c$): Split T after the column c and copy the primary keys at columns 1 . . . $pk_c$ to the new table.

Remove Row(T, r): Remove the row r in T.

RemoveCol(T, c): Remove the column c in T.

Swap Rows(T, r): Swap rows r and r+1 in T.

Shift Cell(T, (i, j)): Shift the cell (i,j) to the row below, while keeping its cell boundaries.

Table 1 shows examples of the instructions and formal semantics. To simplify the Create Column semantics, it can be assumed that: (i) for indices addressing cells after the maximal row or column (i>$i_{MR}$ or j>$j_{MC}$), T(i,j) returns the empty cell (($\perp$,i,j',i,j')), (ii) values span single cells, and (iii) value rows below the n headlines contain a non-empty cell.

Disclosed herein is a tool that can act as a program synthesizer to gradually transform a hierarchical table to a relational table that preserves the semantic relation of the input table. Table 2 shows examples of algorithms utilized by the system. During its operation, the system can maintain (e.g., store) the set tSet. This set can contain pairs of a table and the table's first value row ($i_T$). It can be initialized to contain a pair of the input table T and its value row $i_T$. When the system completes, tSet may contain only relational tables, or a slightly modified T, if the system could not fix T to be canonical and thus did not remove hierarchy (the disclosed implementations inform the user in such cases). If the input table is canonical or can be fixed to be canonical, the system may output a set of relational tables. This follows since executing the instructions results in canonical tables or tables that can be fixed to be canonical.

The system can operate in a loop, where at each step it picks the next instruction and executes it. To decide on the next instruction, the system can consult instruction functions. An instruction function can be associated with a unique instruction, and when given the table set, it can determine whether its instruction is applicable to one of the tables. If so, it can return an instantiation of an instruction; otherwise, it can return null. When there are no more applicable instructions, the system can output the table(s) and/or the synthesized program.

TABLE 1

DSL for removing hierarchy in tables: syntax and semantics. Helper functions are at the bottom.

| Instruction | Semantics |
|---|---|
| CreateColumn(T,(i, j), n) (i', j') ← | (The n neighbours are: ($i_0$, $j_0$) = (i, j),($i_{k+1}$, $j_{k+1}$)=(i, $\text{argmin}_j$, {j' > $j_k$|T(i, j') ≠ T(i, $j_k$)}))) |
| case i' ≤ $i_{MR} \wedge$ j' < $j_{i,j}^B$: | T(i', j')  (Copy headlines and values to the left of (i,j).) |
| case i' = $i_T$ − 1 $\wedge$ j' = $j_{i,j}^B$: | ("H" + cnt, i', j', i', j')  (Add artificial headline: cnt is # art. headlines.) |
| case i' ≤ $i_{MR} \wedge$ j' = $j_{i,j}^B$: | ($c_{i,j}$, i', j', i', j')  (Copy the headline at (i,j) to the new column.) |
| case i' ≤ $i_{MR} \wedge$ j' = $j_{i,j}^E$: | shft((T, i', j' − 1), 0,1)  (Shift right headlines due to the new column.) |
| case i' < $i_T \wedge$ j' > $j_{i,j}^E$: | dup(i', j') < j'?($\perp$, i, j', i, j') : shft((T, i', j' − 1), 0, 1) |

TABLE 1-continued

DSL for removing hierarchy in tables: syntax and semantics. Helper functions are at the bottom.

| Instruction | Semantics |
|---|---|
| $T\begin{bmatrix}\text{case } i' \leq i_{MR} \wedge j' > j_{i,j'}^E:\end{bmatrix}$ | (Handle the headlines to the right: remove duplicates, shift the others.) $j' \leq j_{i_n,j_n}^E ? (\perp, i, j', i, j') : \text{shft}((T, i', j' - 1), 0, 1)$ (Handle values to the right: remove those below the n cells, shift the others.) |
| case $j' < j_{i,j}^B$: | $(c_{i' mod (i_{MR} - i_T), j'}, i', j', i', j')$ (Copy left values to new rows.) |
| case $j' = j_{i,j}^B$: | $\left(c_{i\lfloor\frac{i'}{i_{MR}-i_T}\rfloor, j\lfloor\frac{i'}{i_{MR}-i_T}\rfloor}, i', j', i', j'\right)$ (Copy n headlines to new column.) |
| case $j' > j_{i_n,j_n}^E + 1$: | $(C_{i' mod (i_{MR}-i_T), j'-1}, i', j', i', j')$ (Copy right values to new rows.) |
| case $\exists k. \lfloor\frac{i'}{i_{MR}-i_T}\rfloor = k \wedge \exists j'' \in \{j_{i_k,j_k}^B \ldots j_{i_k,j_k}^E\}, j'-1 = \text{dup}(i_T - 1, j'')$: | $(c_{i' mod (i_{MR} - i_T), j''}, i', j', i', j')$ |
| case default: | shft(T(i',j'),0,1) (Last two cases: copy the values of the n cells.) |
| Split(T, c, pk$_c$) | $T[(i, j) \leftarrow j > c?(\perp, i, j, i, j): T(i, j)], T[(i, j) \leftarrow j \leq pk_c?(i, j): \text{shft}((T, i, j + c), 0, -c))$ |
| RemoveRow(T, r) | $T[(i, j) \leftarrow (i_{i,j}^B < r \leq i_{i,j}^E)?(c_{i,j}, i_{i,j}^B, j_{i,j}^B, i_{i,j}^E - 1, j_{i,j}^E): i_{i,j}^B > r?\text{shft}((T, i + 1, j), -1, 0)): T(i, j)]$ |
| RemoveCol(T, c) | $T[(i, j) \leftarrow (j_{i,j}^B < c \leq j_{i,j}^E)?(c_{i,j}, i_{i,j}^B, j_{i,j}^B, i_{i,j}^E, j_{i,j}^E - 1): j_{i,j}^B > c?\text{shft}((T, i, j + 1), 0, -1)): T(i, j)]$ |
| SwapRows(T, r) | $T[(i, j) \leftarrow i = r?\text{shft}((T, r + 1, j), -1, 0): i = r + 1?\text{shft}((T, r, j), 1, 0): T(i, j)]$ |
| ShiftCell(T, (i, j)) $T\begin{bmatrix}(i', j') \leftarrow \\ \text{case } i' = i \wedge j_{i,j}^B \leq j' \leq j_{i,j}^E \quad (\perp i, j', i, j') \\ \text{case } i' = i + 1 \wedge j_{i,j}^B \leq j' \leq j_{i,j}^E \quad (c_{i,j}, i+1, j_{i,j}^B, i_{i,j}^E, j_{i,j}^E) \\ \text{case default} \quad T(i', j')\end{bmatrix}$ | | shft((T, i, j), r, c) = $(c_{T,i,j}, i_{T,i,j}^B + r, j_{T,i,j}^B + c, i_{T,i,j}^E + r, j_{T,i,j}^E + c)$ dup (i', j') = argmin$_{j'''}\{j''' \leq j'|1 \leq i'' \leq i_T - 1, c_{i'',j'''} = C_{i',j'}\}$ Determining the headline region is now described in greater detail. The computeValueRow operation (Algorithm 2) can take as input a table T and return the row where the values begin.

It can be assumed that T has at least one headline row whose cells span a single column. If there is no such headline row, then either: (i) two columns in the value region cannot be distinguished and thus T cannot be transformed to relational tables (where columns have unique headlines), or (ii) this table is not canonical and cannot be fixed by the system.

Thus, computeValueRow can first compute minRow, the minimal row whose cells span single columns. Then, it can compute the minimal row, greater than minRow, that maximizes the size of votes(i). votes(i) can be the set of columns that "vote" that the values begin at row i. A column j belongs to votes(i) if i is the minimal row where the content of the cell at (i, j) is similar enough to one of the cells below. Similarity can be determined by invoking simScore on the cells' contents and determining if the returned score exceeds a predefined threshold S (we set S=0.8). The simScore function, can be used by the former components, that for two strings or sequences of strings can return a score on a scale of 0-1 indicating how similar are the inputs, where the higher the simScore value, the more similar are the inputs.

TABLE 2

A list of helper functions of computeValueRow

Algorithm 1: Relater(T)
1     prog = $\perp$; tSet = {(T.computeValueRow(T))}
2     while $\exists$f.f.applicable(t.Set) $\neq$ null do
3       | inst = f.applicable(tSet)
4       | tSet = f.execute(tSet, inst)

TABLE 2-continued

A list of helper functions of computeValueRow

5       | prog += inst
6     return {t | $\exists$r.(t,r) $\in$ tSet}, prog
Algorithm 2: computeValueRow(T)
1     minRow = argmin$_i\{i \mid \forall j.j_{i,j}^B = j_{i,j}^E\}$
2     return argmin$_i\{\{\text{argmax}_i\{|\text{votes}(i)| \mid i > \text{minRow}\}\}\}$
votes(i) = {j $\in$ [j$_{MC}$] | sim(i,j) $\wedge$ $\forall$i' < i.¬sim(i',j)}
sim(i,j) = $\exists$i$_2$ > i. simScore(c$_{i,j}$, c$_{i2,j}$) $\geq$ S Next, it is described how the instruction functions that enable the system to determine the next instruction. Instruction functions can provide an interface to a unique instruction type by: (i) deciding whether the instruction is applicable to one of the tables and if so, creating a specific instruction, and (ii) executing the instructions they created. These are supported via "applicable" and "execute," respectively.

In the case of "applicable," it takes as input the system's working set, determines whether the instruction is applicable, and if so returns a non-null instruction. "Execute" can take as input the working set and an instruction created by applicable. Table 3 provides an example of the implementation of the instruction functions. For example, RemoveRow can be selected if there is an empty row, and ShiftCell can be selected if there is a cell whose directly below cells are empty or artificial headlines. If the condition checked by applicable is met, an instruction can be generated. The execute implementation is also straightforward: it can update the table set to contain the modified table, defined by the instruction semantics, and the updated value row. The value row (i$_T$) can be copied, except when removing a row from the headline region. The conditions that can trigger the hierarchy removal steps are next described.

The CC condition, synthesizing CreateColumn instructions, can be generated if tables are canonical and there is a table whose top-left cell has n similar neighbors for some positive number n. To check these, CC may rely on a few predicates and functions: (i) first(i, j): may be satisfied if this pair is the top-left indices of its cell, i.e., $i_{i,j}{}^B = i$, $j_{i,j}{}^B = j$; (ii) can: may be satisfied if all tables are canonical, that is there are no empty rows or columns, below every headline not in the last headline row there is a non-artificial headline, and headlines boundaries cover the boundaries of cells below them; (iii) $pk_c(T)$: may return the index of the last primary key column; (iv) topleft(i, j): may be satisfied if the cell at (i, j) is the top-left cell whose hierarchy has to be removed, i.e., it is not a title or a headline covering all headlines but the primary keys, and it is not part of the primary key columns; (v) similar(i,j,n): satisfied if the headlines below (i, j) and its n followers are similar and also the first $i_K$ value rows are similar, too ($i_K$=15 may be set, for example); (vi) sim(i, j, i', n, Th): satisfied if for every follower of (i, j) the content of cells at row i' are similar to the content of the cells below (i,j) or one of the previous followers. The contents may be similar if simScore returns a score exceeding the threshold Th. For the headlines similarity, $Th_{h-low}$=0.4 may be set. For the values similarity, a range may be chosen between $T_{v-low}$=0.8 and $Th_{v-high}$=0.87 according to whether the headline similarity high threshold, $Th_{h-high}$=0.9, is exceeded. $Th_{v-high}$ can make the system can determine similarity only if the values are significantly similar (as the headline did not provide a strong evidence for similarly). $Th_{v-low}$ can make the system more tolerant about value variance if the headlines are significantly similar. Thus, the stringency of the similarity can be adjusted according to the desired outcome.

The S condition, synthesizing Split instructions, may be generated if tables are canonical and in all tables the top-left cell has no similar neighbors (i.e., CC is not satisfied).

The simScore operation may estimate similarity of strings or string sequences. It can adapt the Needleman-Wunsch algorithm (e.g., similar to Damerau-Levenshtein algorithm), commonly used in DNA sequence alignments. This is a dynamic programming algorithm that can take two strings and a price matrix and computes the cheapest alignment. Four operations can be used to align: match, omit, add, and characters substitution. Each has a price: match costs 0, omit and add cost 1, and substitution costs are listed in the price matrix.

TABLE 3

The system's instruction functions including "applicable" and "execute." Helper predicates and functions are shown at the bottom.

| Name | Applicable Condition | Applicable Instruction | Execute |
|---|---|---|---|
| CC | $\exists T \in tSet.\exists i \exists j \exists n.can \wedge i < i_T \wedge$ $n > 0 \wedge first(i, j) \wedge topleft(i, j) \wedge$ $similar(i, j, n) \wedge !similar(i, j, n + 1)$ | CreateColumn(T, (i, j), n) | $\{([CreateColumn(T, (i, j), n)], i_T)\} \cup$ $\{(T', i_{T'}) \mid (T', i_{T'}) \in tSet \wedge T' \neq T\}$ |
| S | $\exists T \in tSet.\exists i \exists j.can \wedge i < i_T - 1 \wedge$ $topleft(i, j)^{pk_c(T)} < j < j_{MC} \wedge \neg CC$ | Split(T, $j_{i,j}{}^E$, $pk_c(T)$) | $\{(T', i_{T'}) \mid T' \in [Split(T, j_{i,j}{}^E, pk_c(T))]\} \cup$ $\{(T', i_{T'}) \mid (T', i_{T'}) \in tSet \wedge T' \neq T\}$ |
| RR | $\exists T \in tSet.\exists r.\forall j.c_{r,j} = \bot \vee r \neq i_{r,j}{}^B$ | RemoveRow(T, r) | $\{([RemoveRow(T, r)], r < i_T ? i_T - 1: i_T)\} \cup$ $\{(T', i_{T'}) \mid (T', i_{T'}) \in tSet \wedge T' \neq T\}$ |
| RC | $\exists T \in tSet.\exists c.\forall i.c_{i,c} = \bot \vee c \neq j_{i,c}{}^B$ | RemoveCol(T, c) | $\{([RemoveCol(T, c)], i_T)\} \cup$ $\{(T', i_{T'}) \mid (T', i_{T'}) \in tSet \wedge T' \neq T\}$ |
| SW | $\exists T \in tSet.\exists r.$ $\forall j.(j_{r+1,j}{}^B \leq j_{r,j}{}^B \wedge j_{r+1,j}{}^E \leq j_{r,j}{}^E) \wedge$ $\exists j.(j_{r+1,j}{}^B < j_{r,j}{}^B \vee j_{r,j}{}^E < j_{r+1,j}{}^E)$ | SwapRows(T, r) | $\{([SwapRows(T, r)], i_T)\} \cup$ $\{(T', i_{T'}) \mid (T', i_{T'}) \in tSet \wedge T' \neq T\}$ |
| SC | $\exists T \in tSet.\exists i.\exists j.first(i, j) \wedge$ $\forall j'.(j_{i,j}{}^B \leq j' \leq j_{i,j}{}^E \rightarrow$ $c_{i+1,j'} = \bot \vee c_{i+1,j'} = H[0-9]^+)$ | ShiftCell(T, (i, j)) | $\{([ShiftCell(T, (i, j))], i_T)\} \cup$ $\{(T', i_{T'}) \mid (T', i_{T'}) \in tSet \wedge T' \neq T\}$ |

$first(i, j) = (i_{i,j}{}^B = i \wedge j_{i,j}{}^B = j)$
$can = \neg RR \wedge \neg RC \wedge \neg SC \wedge \forall T \forall i \forall j.(j_{T,i,j}{}^B \leq j_{T,i+1,j}{}^B \wedge j_{T,i+1,j}{}^E \leq j_{T,i,j}{}^E)$
$pk_c(T) = argmin_i \{j \mid \forall i_1 \forall i_2 (c_{i_1,1}, \ldots, c_{i_1,j}) \neq (c_{i_2,1}, \ldots, c_{i_2,j})\}$
$topleft(i, j) = \forall i' \forall j'.(i' < i \vee (i' = i \wedge j' < j)) \rightarrow (j_{r,j'}{}^B \leq pk_c(T) \vee (j_{i',j'}{}^B \leq pk_c(T) \wedge j_{i',j'}{}^E = j_{MC})$
$similar(i, j, n) = (\forall i', i \leq i' < i_T \rightarrow sim(i, j, i', n, Th_{h-low})) \wedge (\forall i'.i_T \leq i' < i_K \rightarrow sim(i, j, n, i', Th_{val})$
$Th_{val} = (\exists i'.i \leq i' < i_T \rightarrow sim(i, j, i', n, Th_{h-high}))?Th_{v-low}: Th_{v-high}$ $$sim(i, j, i', n, Th) = \bigwedge_{1 < k \leq n} \exists k' < k.simScore\left(\left(c_{i',j_{k'}}{}^B, \ldots, c_{i',j_{k'}}{}^E\right), \left(c_{i',j_k}{}^B, \ldots, c_{i',j_k}{}^E\right)\right) > Th$$

(the $(i'_k, j'_k)$, $(i_k, j_k)$ pairs belong to the set $\{(i_0, j_0), \ldots, (i_n, j_n)\}$, as defined in Table 1)

This algorithm may penalize any dissimilarity, and thus can often over-penalize strings that humans consider similar. First, since the system may rely on thresholds to determine whether strings are similar, scores are normalized to values between 0 (different) and 1 (identical) by dividing the distance by the length of the longest string. As a result, costs can be changed: match is 1, omit and add are 0, and the price matrix may contain values closer to 1 as the characters are more similar. Second, to avoid performance slowdown, only a portion of the characters may be read from strings (for example, only the first 20 may be used), which can suffice for estimating similarity. Lastly, a few rules indicating similarity can be determined: (i) two numbers may be more similar as their order of magnitude is closer, (ii) words similarity may be a function of capitalization, letters (captures noun structures and grammar tenses), and length, and (iii) similar phrases can often have a common word (e.g., measurement units). Furthermore, the disclosed implementations involved the following design choices. First, the price matrix values are: (i) substituting a digit with a digit may be 0.9 (almost identical), (ii) a letter with a letter of the same case may be 0.8 and of different case may be 0.7 (less than digits, since unlike numbers, words typically have to share letters to be similar), (iii) otherwise, the price may be, for example, 0.125 (to give higher score to strings of similar length). Second, to improve performance with different representations of numbers (e.g., 0.3 and 0.333 . . . ), the two-digit representation may be considered. For numbers in (−1, 1), the digits up to two digits after the significant digit may be considered. Lastly, to identify similar phrases, if phrases contain words whose similarity exceeds the 0.9 threshold, simScore may return 0.9.

Recall that the system can be configured such that $Th_{h\text{-}high}=0.9$, thus for such headlines the system may consider the lower value threshold ($Th_{v\text{-}low}$).

For string sequences, simScore may compute the best alignment of sequences (i.e., strings are aligned). The costs of match, omit, and add may be identical, and the cost of string substituting may be the cost of aligning them (as described before).

A correctness theorem is next described. THEOREM 1. If T is canonical or can be fixed to canonical and if the system can identify the headline region correctly and classifies headlines correctly, then the system can output a set of relational tables preserving T's semantic relation.

The system cannot get "stuck," can output relational tables, and the tables may preserve the relational information.

The system may get "stuck" only if an intermediate table is non-canonical and cannot be fixed. Though there may be non-canonical intermediate tables, these are only tables generated by Create Column instructions. Since they can only violate the canonical properties by having empty rows or columns or headlines whose cells below are empty, they can be fixed by the system. Thus, the disclosed system cannot get stuck.

The system can output relational tables, since while there is a hierarchical headline (evident by the top left predicate), either the CC condition or the S condition must be met (after fixing the tables to be canonical).

To demonstrate that the semantic relation is preserved, an induction on the program size can be used that every instruction preserves the semantic relation. The base is trivial. The correctness of the induction step may follow from the instruction semantics and parameters choice. Remove Row and RemoveCol may be executed on empty rows and columns, namely they do not change the value region or the headline boundaries, hence the semantic relation may be preserved. Swap Rows and Shift Cell also may not change the value region and may keep the headline boundaries, thus the semantic relation may be preserved. Split can preserve the relational information because related values that are split remain related via the primary key columns, and since headlines continue to cover the same values. Create Column can preserve the relational information because it is assumed to be invoked only on data headlines. Thus, these headlines were part of the semantic relation and they continue to be part of the same pairs, since they may be copied to each row of their values and since they and their values may not be covered by different same universe headlines. Other headlines may continue to cover the same values and the artificial headlines may be descriptors (by definition), and thus do not introduce new relations.

Next, at least some of the disclosed implementations were experimentally evaluated.

To examine the frequency of tables that the disclosed system can handle, the first 200 spreadsheet tables from the SAUS corpus may be classified. All tables in this corpus are row-oriented, and are classified according to the disclosed implementations based on the headline structures. All tables in this corpus are row-oriented, and may be classified based on the headline structures: (i) top hierarchy: the type the system can handle, (ii) left hierarchy: the system can handle such tables if their transpose is a top hierarchy table. This was not the case for tables in this corpus (their headlines are mostly in a single column and hierarchy is expressed via formatting features such as spaces), (iii) top and left hierarchy: the system may does not support such tables, and (iv) relational tables: there may be no need for the system as disclosed herein. We note that some tables had single-row headlines after a bulk value rows. Such headlines may be treated as indicators for new tables of the same structure. Such tables may be classified based on their first table (since all the table parts have the same structure). Table 4 summarizes the distribution. Table 4 shows that the top hierarchy is the common structure, while the relational structure is the least common.

TABLE 4

Distribution of headline structures.

| Type | # | % |
| --- | --- | --- |
| Top hierarchy | 108 | 54% |
| Left hierarchy | 38 | 19% |
| Top and left hierarchy | 37 | 18.5% |
| Relational tables | 17 | 8.5% |

The system can be implemented in any programming language. In the examples disclosed herein, it is implemented in C# and integrated in a standard spreadsheet program or application. The system may be accessible via a designated button. Users can choose the table region and click the button, or, if the spreadsheet contains a single table, they can click the button without choosing the region. Then, the system can compute the row where the value region begins and asks the user to confirm or fix. Then, the system can synthesize the program and can output the relational tables to the spreadsheet and the program to a drop-down list. The user can then examine the program and view the intermediate states. The user can also fix, add, or remove an instruction and re-execute the system from that point.

An implementation of the disclosed system was evaluated by measuring how well it succeeds in identifying correctly the headline region and the different types of headlines (data/descriptor and same/different universe headlines). If these are correct, the system can output a set of relational tables preserving the input table's relational information (as discussed earlier). Experiments were conducted on a consumer laptop operating a standard spreadsheet program.

The system was evaluated on 80 spreadsheet tables that are row-oriented and with hierarchical headline structure. The tables were collected from three resources: (i) the FUSES corpus (32 tables), (ii) the SAUS corpus (30 tables), and (iii) collected tables from the web (18 tables). From each resource, the first tables collected were those that showed top hierarchical headline structures. For each table, merged regions were manually fixed if needed, since the system can assume that headlines that add information to cells below also syntactically cover them. Summary lines in tables were also removed, which do not provide relational information. If there were headlines in the middle of the value region, the part of the table up to these headlines was considered. Table 5 shows the distribution of the number of (non-empty) headline rows and value rows. "H. Rows" and "Value rows" are the number of headline/value rows and "#T" is the number of tables. Table 6 shows the distribution of the number of groups, data headlines, and descriptor headlines.

TABLE 5

Distribution of headline and value rows

| H. Rows | #T | H. Rows | #T | Value Rows | #T |
|---|---|---|---|---|---|
| 2 | 23 | 8 | 5 | {1, ..., 10} | 9 |
| 3 | 14 | 9 | 1 | {11, ..., 30} | 24 |
| 4 | 14 | 10 | 1 | {31, ..., 60} | 26 |
| 5 | 8 | 11 | 0 | {61, ..., 100} | 3 |
| 6 | 7 | 12 | 1 | {101, ..., 200} | 8 |
| 7 | 6 | | | {200, ...} | 10 |

TABLE 6

Distribution of groups and types of headlines

| #Groups | #T | #Data H. | #T | #Descriptors | #T |
|---|---|---|---|---|---|
| 1 | 28 | {1, ..., 5} | 21 | {1, ..., 5} | 25 |
| 2 | 28 | {6, ..., 10} | 28 | {6, ..., 10} | 19 |
| 3 | 11 | {11, ..., 15} | 15 | {11, ..., 15} | 18 |
| 4 | 9 | {16, ..., 20} | 33 | {16, ..., 20} | 10 |
| 5 | 1 | {20, ..., 30} | 4 | {20, ..., 30} | 6 |
| 7-8 | 2 | {30, ...} | 3 | {30, ...} | 2 |

TABLE 7

Success rate of headline region detection

| | | | Mistake Gap | | | | |
|---|---|---|---|---|---|---|---|
| | Correct | Failed | |1| | |3| | 8 | 29 | ∞ |
| RELATER | 78 | 0 | 2 | 0 | 0 | 0 | 0 |
| Senbazuru | 60 | 2 | 9 | 2 | 1 | 1 | 5 |

To evaluate the headline region detection, the value row of each table was manually determined. Then, the disclosed system and Senbazuru were used to process the tables. As stated earlier, Senbazuru is a machine-learning solution that can label rows to "title," "headline," "data," or "footnote." Thus, to compare to the disclosed system, its value region was identified as the first row labeled as "data." Table 7 shows the results of the experiment. "Correct" is the number of tables identified correctly. "Failed" is the number on which the algorithm did not produce output. "Mistake Gap" is the difference between the algorithm result and the correct result (∞ means that no data rows were detected).

Senbazuru automatically extracts relational tuples from hierarchical tables, but assumes that the relational information is a list of tuples consisting of a value and its headlines. As demonstrated in Section 6, this assumption is often false: some headlines do not provide data and some values may be related. To illustrate their assumption, some of the tuples Senbazuru returns on the table in FIG. 1 are (New York, Policy Form, Type, HO-1), and (New York, Policy Form, Freq. Dist, 1995, 0.3%). These tuples remove the relation between the insurance type and the frequency distribution and include the descriptors "Type" and "Freq. Dist." To build the tuples, Senbazuru uses a machine learning algorithm that relies on features such as merged cells and bold font.

To evaluate the disclosed system's headline classification, headlines were manually classified to descriptor/data headlines and same universe headlines were manually identified. To evaluate descriptor/data headline classifications of the disclosed implementations, precision and recall was computed. Table 8 shows the averages, standard deviation, maximum and minimum values, and the percentages of tables that were classified perfectly (recall or precision equal to 1). The high values reported in the table demonstrate the ability of the disclosed system to correctly remove hierarchy in real-world spreadsheet tables. To evaluate correct classification of same universe headlines, the number of headlines that were classified as data headlines that were also classified to the correct same universe groups was computed. This was the case for all headlines, except for one case where the headlines were "5th," "10th," "25th," "Median," "Average," "75th," "90th," and "95th," and system split them to three groups.

TABLE 8

Precision and recall of the system's classification

| | | Average$_{(STDEV)}$ | Max | Min | P |
|---|---|---|---|---|---|
| Descriptor | Recall | $0.957_{(0.12)}$ | 1 | 0.5 | 84% |
| | Precision | $0.977_{(0.06)}$ | 1 | 0.6 | 83% |
| Data | Recall | $0.966_{(0.09)}$ | 1 | 0.6 | 83% |
| | Precision | $0.964_{(0.12)}$ | 1 | 0.33 | 85% |

TABLE 9

Execution times (in milliseconds)

| | Average$_{(STDEV)}$ | Max | Min |
|---|---|---|---|
| Headline detection | $95_{(198)}$ | 967 | 1 |
| Headline manipulation | $1709_{(3306)}$ | 19574 | 9 |

TABLE 10

Synthesized programs' sizes

| | Average$_{(STDEV)}$ | Max | Min |
|---|---|---|---|
| # Instructions | $21.16_{(17.87)}$ | 97 | 2 |

TABLE 11

Additional fixes to obtain the "correct" table

| | | | Fix Type Distribution | | | |
|---|---|---|---|---|---|---|
| #F | #T | % | Type | % | Type | % |
| 0 | 56 | 70% | Add | 6.1% | Reduce | 9.1% |
| 1 | 17 | 21.3% | Remove | 33.3% | Manual | 3% |
| 2 | 6 | 7.5% | Extend | 42.4% | Headline | 6% |
| 3 | 1 | 1.3% | | | | |

Figure 7:
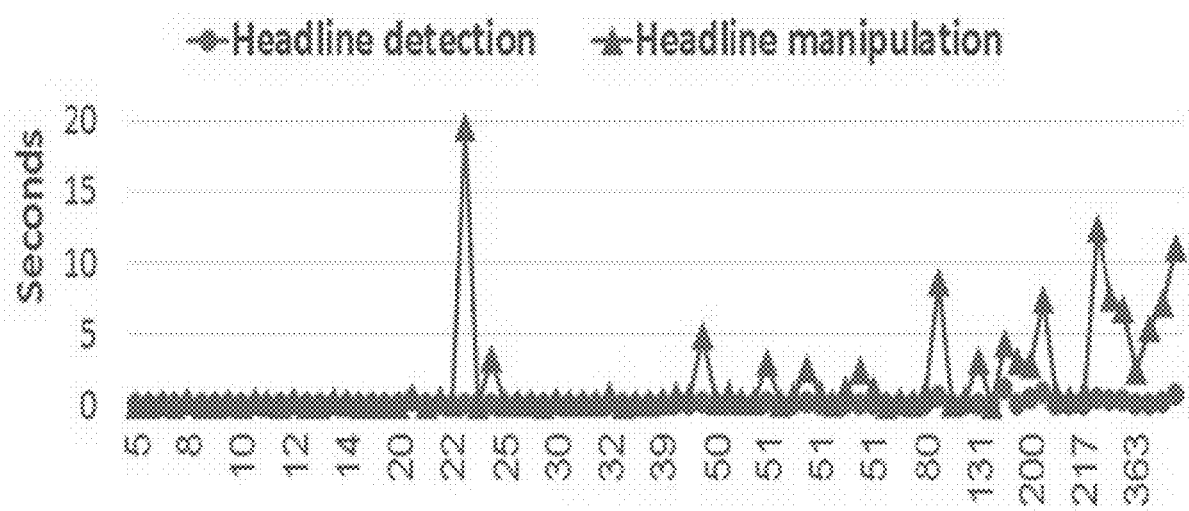
FIG. 7 illustrates an example of a correction applied to a resultant table according to an implementation disclosed herein.

To evaluate the system's execution time, the time spent on detecting the headline region and the time spent on the hierarchy removal process was measured. Table 9 shows the results. The headline detection completed in less than a second on all tables in the experimental data set. The hierarchy removal process completed on average within two seconds, and at most within 20 seconds. To understand what affects the duration of the hierarchy removal process, the linear correlation coefficient was computed together with the different table characteristics. The linear correlation coefficient of two values ranges from −1 to 1, where 0 means there is no correlation, 1 means perfect positive fit, and −1 means perfect negative fit. The highest correlation we observed was to the number of value rows (0.77). This is expected as the more values rows in the table, the longer it takes to execute Create Column instructions. FIG. 7 illustrates an example of this correction. The second highest correlation was to the number of groups (0.54). This is expected, too, since it is the number of Create Column instructions.

The sizes of the programs that the system has synthesized were also examined. Table 10 shows the results, which indicate that even though our DSL is tailored for specific purposes, the synthesized programs contained 21 instructions on average. Furthermore, only 12 of programs had at most 5 instructions, and only 21 had at most 10 instructions. This demonstrates the need to automatically synthesize these programs.

Finally, the end-to-end transformation was examined, as well as how many fixes are required to obtain the desired tables. Six types of fixes were identified: (i)+(ii) add/remove: an instruction has to be added/removed from the program, (iii)+(iv) extend/reduce: an instruction of type Create Column has to increase/decrease its num followers parameter, (v) manual: the user has to manually fix a typing mistake, and (vi) headline: the user has to fix the row where the value region begins. Table 11 shows the results. "#F" shows the number of fixes required, "#T" and "%" show the number and percentage of tables that required that many fixes. The rest of the table shows the distribution of the fix types. The reasons for having to add an instruction or parameter (i.e., same universe headlines are classified as descriptors or different universe headlines) are:

The number of words was different (8 tables).
The headline was All or Total and was syntactically different from the others headlines (6 tables).
The headlines were different words (1 table).
The values were from different ranges (1 table). The reasons for having to remove an an instruction or parameter (i.e., descriptors classified as same universe headlines) are:
The headlines had a similar number of words (greater than 2) (6 tables).
The headlines had a shared word (5 tables).
The headlines were short (≤5 characters) (1 table).
The values compared were all N/A (1 table). The reasons for identifying incorrectly the headline region were that the first value row was mostly empty (1 table) or that its values were different from the values below (1 table).

Figure 8:
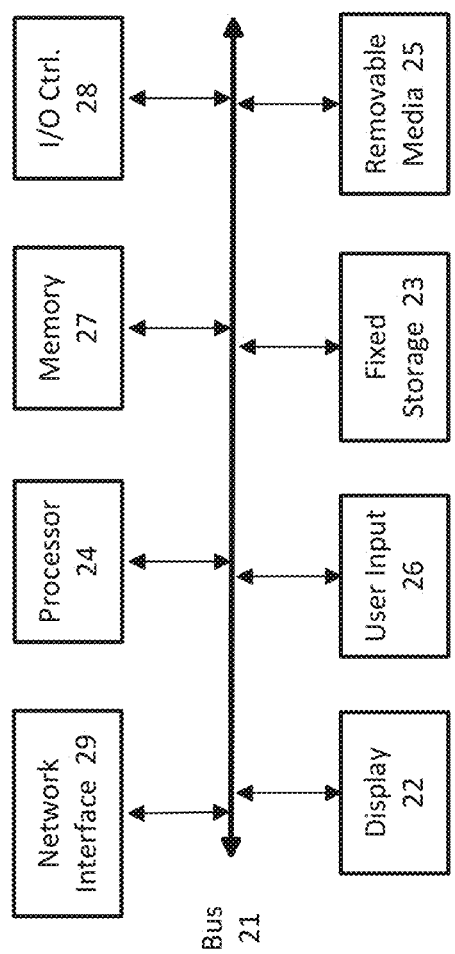
FIG. 8 is an example computer (e.g., electronic device such as a smartphone, tablet, laptop, personal computer, etc.) suitable for implementing embodiments of the presently disclosed subject matter.

Embodiments of the presently disclosed subject matter may be implemented in and used with a variety of component and network architectures. FIG. 8 is an example computer 20 (e.g., electronic device such as a smartphone, tablet, laptop, personal computer, etc.) suitable for implementing embodiments of the presently disclosed subject matter. The computer 20 includes a bus 21 which interconnects major components of the computer 20, such as a central processor 24, a memory 27 (typically RAM, but which may also include read-only memory ("ROM"), flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include ROM or flash memory (neither shown), and RAM (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks. Many other devices or components (not shown) may be connected in a similar manner (e.g., digital cameras or speakers). Conversely, all of the components shown in FIG. 8 need not be present to practice the present disclosure. The components can be interconnected in different ways from that shown. The operation of a computer such as that shown in FIG. 8 is readily known in the art and is not discussed in detail in this application. Code to implement the present disclosure can be stored in computer-readable storage media such as one or more of the memory 27, fixed storage 23, removable media 25, or on a remote storage location.

Figure 9:
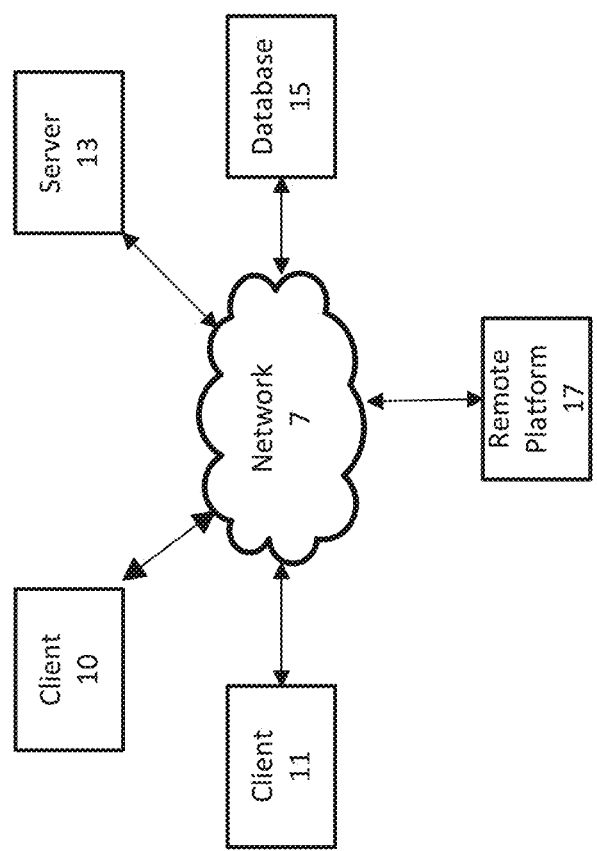
FIG. 9 shows an example network arrangement according to an embodiment of the disclosed subject matter.

FIG. 9 shows an example network arrangement according to an embodiment of the disclosed subject matter. One or more clients 10, 11, such as local computers, smartphones, tablet computing devices, and the like may connect to other devices via one or more networks 7. As described earlier, the communication partner may operate a client device that is remote from the device operated by the user (e.g., in separate locations). The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15. A system is disclosed herein which can perform one or more of the various processes as described above and illustrated in FIGS. 2A-C, 3, and 4. The system may perform the processes on different machines that are connected by a network, and/or on a local computer such as a client device. In some instances, for example, the system may include one or more database(s) 15 or fixed storage 23 of a device to store one or more tables, at least one of which is a hierarchical table. The system may have a processor 24 or a server that can access the database(s) 15 to perform processes associated with the disclosed implementations.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter.

When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A system, comprising:
   a database configured to store one or more tables, at least one of which is a hierarchical table with a plurality of rows and a plurality of columns;
   a processor communicatively coupled to the database, the processor configured to:
   receive the hierarchical table comprising a plurality of headlines and a plurality of values;
   identify a headline row in the hierarchical table comprising at least one cell that spans greater than one column of the hierarchical table, but not all columns containing data in the hierarchical table;
   determine a candidate row for each of the plurality of columns of the hierarchical table corresponding to a first row that has content similar to at least one cell below the first row based on a score of contents of cells of the candidate row exceeding a first predefine threshold;
   perform the following process:
   (i) beginning with a leftmost cell in the headline row, classify each headline in the headline row as a data headline or a descriptor headline by determining whether the leftmost cell has similar content to its neighbor in the headline row based on a score of contents of the leftmost cell exceeding a second predefine threshold, wherein if the leftmost cell has similar content, it is classified as a data headline and otherwise it is classified as a descriptor headline;
   (ii) generate a new column for each data headline classified as a data headline, and for each headline classified as a descriptor headline, split the table vertically after the each descriptor headline thereby producing a resultant table;
   (iii) store the resultant table to the database; and
   (iv) repeat steps (i) to (iii) on the resultant table until there are no headlines classified as data headlines in the resultant table.

2. The system of claim 1, wherein the first row is selected based upon a majority of the plurality of columns of the hierarchical table returning that the first row has content to at least one cell below the first row.

3. The system of claim 2, the processor further configured to:
   determine that the hierarchical table is not in a canonical form; and
   undertake at least one remedial measure to place the table in canonical form, the at least one remedial measure being selected from the group consisting of: deleting an empty row, deleting an empty column, and shifting one or more cells.

4. The system of claim 1, the processor further configured to identify at least one primary key in the resultant table.

5. The system of claim 1, the processor further configured to output a synthesized program comprising a computational description of each adjustment to the hierarchical table to obtain the resultant table.

6. The system of claim 1, the processor further configured to display the resultant table to a user responsive to a request.

7. The system of claim 1, wherein i) the determination of similarity of content of the first row to the at least one cell below the first row or ii) the determination of similarity of content of the leftmost cell to its neighbor in the headline row is further based on the score being estimated by a Needleman-Wunsch string edit distance metric.

8. A computer-implemented method, comprising:
   receiving a hierarchical table comprising a plurality of rows, a plurality of columns, a plurality of headlines and a plurality of values;
   identifying a headline row in the hierarchical table comprising at least one cell that spans greater than one column of the hierarchical table, but not all columns containing data in the hierarchical table;
   determining a candidate row for each of the plurality of columns of the hierarchical table corresponding to a first row that has content similar to at least one cell below the first row based on a score of contents of cells of the candidate row exceeding a first predefine threshold;
   performing the following process:

(i) beginning with a leftmost cell in the headline row, classifying each headline in the headline row as a data headline or a descriptor headline by determining whether the leftmost cell has similar content to its neighbor in the headline row based on a score of contents of the leftmost cell exceeding a second predefine threshold, wherein if the leftmost cell has similar content, it is classified as a data headline and otherwise it is classified as a descriptor headline;

(ii) generating a new column for each data headline classified as a data headline, and for each descriptor headline, split the table vertically after the each descriptor headline thereby producing a resultant table;

(iii) storing the resultant table; and (iv) repeating steps (i) to (iii) on the resultant table until there are no headlines classified as data headlines in the resultant table.

9. The method of claim 8, wherein the first row is selected based upon a majority of the plurality of columns of the hierarchical table returning that the first row has content to at least one cell below the first row.

10. The method of claim 8, further comprising:
determining that the hierarchical table is not in a canonical form; and
undertaking at least one remedial measure to place the table in canonical form, the at least one remedial measure being selected from the group consisting of: deleting an empty row, deleting an empty column, and shifting one or more cells.

11. The method of claim 8, further comprising identifying at least one primary key in the resultant table.

12. The method of claim 8, further comprising outputting a synthesized program comprising a computational description of each adjustment to the hierarchical table to obtain the resultant table.

13. The method of claim 8, further comprising displaying the resultant table to a user responsive to a request.

14. The method of claim 8, wherein i) the determination of similarity of content of the first row to the at least one cell below the first row or ii) the determination of similarity of content of the leftmost cell to its neighbor in the headline row is further based on the score being estimated by a Needleman-Wunsch string edit distance metric.

15. A non-transitory computer readable medium having stored thereon computer readable instructions that are executable to cause one or more processors to perform operations, comprising:
receiving a hierarchical table comprising a plurality of rows, a plurality of columns, a plurality of headlines and a plurality of values;
identifying a headline row in the hierarchical table comprising at least one cell that spans greater than one column of the hierarchical table, but not all columns containing data in the hierarchical table;
determining a candidate row for each of the plurality of columns of the hierarchical table corresponding to a first row that has content similar to at least one cell below the first row based on a score of contents of cells of the candidate row exceeding a first predefine threshold;
performing the following process:
(i) beginning with a leftmost cell in the headline row, classifying each headline in the headline row as a data headline or a descriptor headline by determining whether the leftmost cell has similar content to its neighbor in the headline row based on a score of contents of the leftmost cell exceeding a second predefine threshold, wherein if the leftmost cell has similar content, it is classified as a data headline and otherwise it is classified as a descriptor headline;

(ii) generating a new column for each data headline for each headline classified as a data headline, and for each descriptor headline, split the table vertically after the each descriptor headline thereby producing a resultant table;

(iii) storing the resultant table; and (iv) repeating steps (i) to (iii) on the resultant table until there are no headlines classified as data headlines in the resultant table.

16. The computer readable medium of claim 15, wherein the first row is selected based upon a majority of the plurality of columns of the hierarchical table returning that the first row has content to at least one cell below the first row.

17. The computer readable medium of claim 15, further comprising:
determining that the hierarchical table is not in a canonical form; and
undertaking at least one remedial measure to place the table in canonical form, the at least one remedial measure being selected from the group consisting of: deleting an empty row, deleting an empty column, and shifting one or more cells.

18. The computer readable medium of claim 15, further comprising identifying at least one primary key in the resultant table.

19. The computer readable medium of claim 15, further comprising outputting a synthesized program comprising a computational description of each adjustment to the hierarchical table to obtain the resultant table.

20. The computer readable medium of claim 15, further comprising displaying the resultant table to a user responsive to a request.

* * * * *